(12) United States Patent
Kling

(10) Patent No.: US 8,647,251 B2
(45) Date of Patent: Feb. 11, 2014

(54) COMPONENT FIXTURING METHOD

(76) Inventor: Daniel Kling, Ringoes, NJ (US)

( * ) Notice: Subject to any disclaimer, the term of this patent is extended or adjusted under 35 U.S.C. 154(b) by 575 days.

(21) Appl. No.: 12/722,405

(22) Filed: Mar. 11, 2010

(65) Prior Publication Data
US 2010/0234202 A1 Sep. 16, 2010

Related U.S. Application Data

(60) Provisional application No. 61/159,240, filed on Mar. 11, 2009.

(51) Int. Cl.
B65B 11/00 (2006.01)
B65B 31/00 (2006.01)

(52) U.S. Cl.
USPC .......................................... 493/405; 493/409

(58) Field of Classification Search
USPC .................... 493/405, 409; 462/84
See application file for complete search history.

(56) References Cited

U.S. PATENT DOCUMENTS

| | | | |
|---|---|---|---|
| 2,212,457 A | 8/1940 | Schrier | |
| 2,571,201 A | 10/1951 | Clem | |
| 3,080,784 A | 3/1963 | Schneider | |
| 3,854,249 A | 12/1974 | Fletcher | |
| 4,002,255 A | 1/1977 | Fincham et al. | |
| 4,252,044 A | 2/1981 | Yamashita et al. | |
| 4,548,109 A | 10/1985 | Tokuno et al. | |
| 5,058,475 A | 10/1991 | Tidland et al. | |
| 2005/0087051 A1 | 4/2005 | McGehee et al. | |
| 2005/0267616 A1 | 12/2005 | Kling | |

OTHER PUBLICATIONS

Web page: How to Make a Cootie Catcher; c. 2001.*

* cited by examiner

Primary Examiner — Alexandra Elve
Assistant Examiner — John Paradiso
(74) Attorney, Agent, or Firm — Fox Rothschild LLP

(57) ABSTRACT

An end-configuration of components to be moved or positioned is first obtained. This end-configuration determines the relative positioning and orientation of the components with respect to each other when in a final, desired configuration. A folding pattern is then obtained that is formed by interior vertices defining corresponding tessellation facets. The folding pattern can be induced to transition from a first folded configuration to a second folded configuration. When in the second folded configuration mounting facets, which are a subset of the tessellation facets, are arranged by the geometry of the folding pattern into positions and orientations with respect to each other that correspond to the end-configuration of the components. A foldable structure is then obtained that folds in accordance with the folding pattern, and the components are affixed to their respective mounting facets.

20 Claims, 28 Drawing Sheets

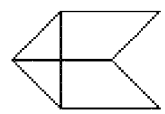
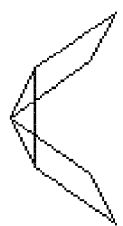
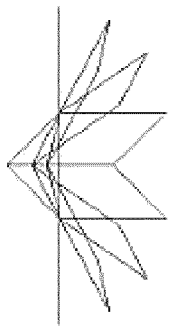
Fig. 22

COMPONENT FIXTURING METHOD

CROSS-REFERENCE TO RELATED APPLICATIONS

This application claims the benefit of U.S. Provisional Application No. 61/159,240 filed on Mar. 11, 2009, the teachings of which are incorporated herein by reference.

STATEMENT REGARDING FEDERALLY FUNDED RESEARCH

The Research Leading to the present invention was supported in part by NASA SBIR Grants NNL06AA52P and NNL07AA12C. Accordingly, the U.S. Government may have certain rights in this invention.

FIELD OF THE INVENTION

The present invention relates generally to methods for positioning objects in space. More particularly, the present invention discloses a method that employs the use of folding structures to position objects in space that are affixed to facets or regions of the folded structure, and to simultaneously move such objects from one position to another.

BACKGROUND OF THE INVENTION

It is often desirable to move multiple components from one configuration to another configuration. Mechanisms may be designed with gears, levers, linkages, pulleys and other mechanical devices to control the trajectories of the components as they transition between various configuration states. Difficulty arises in designing these mechanisms to handle multiple component trajectories so that the motion may occur simultaneously in an orchestrated procedure. In cases where the components move from one periodic arrangement to another periodic arrangement, it may be desirable for their trajectories to move in parallel to maintain the periodicity during movement. Furthermore it may be desirable for the controlling mechanism to be robustly designed for greater fail-safe performance, and to be cost effective to manufacture.

Accordingly, there is an immediate need for improved methods for both the positioning and moving of objects in space in manner that is both cost-effective, reliable and easy to implement.

SUMMARY OF THE INVENTION

In one aspect a method is disclosed for movably positioning a plurality of components. An end-configuration of the components is first obtained. This end-configuration determines the relative positioning and orientation of the components with respect to each other when in a final, desired configuration. A folding pattern is then obtained that is formed by a plurality of interior vertices defining corresponding tessellation facets. The folding pattern can be induced to transition from a first folded configuration to a second folded configuration. When in the second folded configuration a plurality of mounting facets, which are a subset of the tessellation facets, are arranged by the geometry of the folding pattern into positions and orientations with respect to each other that correspond to the end-configuration of the components. A foldable structure is then obtained that folds in accordance with the folding pattern, and the components are affixed to their respective mounting facets.

In preferred embodiments the foldable structure has effectively only one parameter of articulation such that movement in one region of the foldable structure induces corresponding articulating movement across the entirety of the foldable structure. That is, apart from mechanical or structural give, the underlying folding geometry insures that the folded structure will behave like a completely interlocked unit, with all facets folding or unfolding simultaneously as the foldable structure transitions between the first folded configuration and the second folded configuration.

In various embodiments the first folded configuration corresponds to a planar configuration. In a particularly preferred embodiment the components form a thick slab when in the planar configuration. In specific embodiments the components are blocks that form the thick slab and are positioned on the foldable structure such that each block overhangs its respective mounting facet.

BRIEF DESCRIPTION OF THE DRAWINGS

FIG. 22 is an end view illustrating folding progression of the folding geometry indicated in FIG. 19.

DETAILED DESCRIPTION

Figure 1:
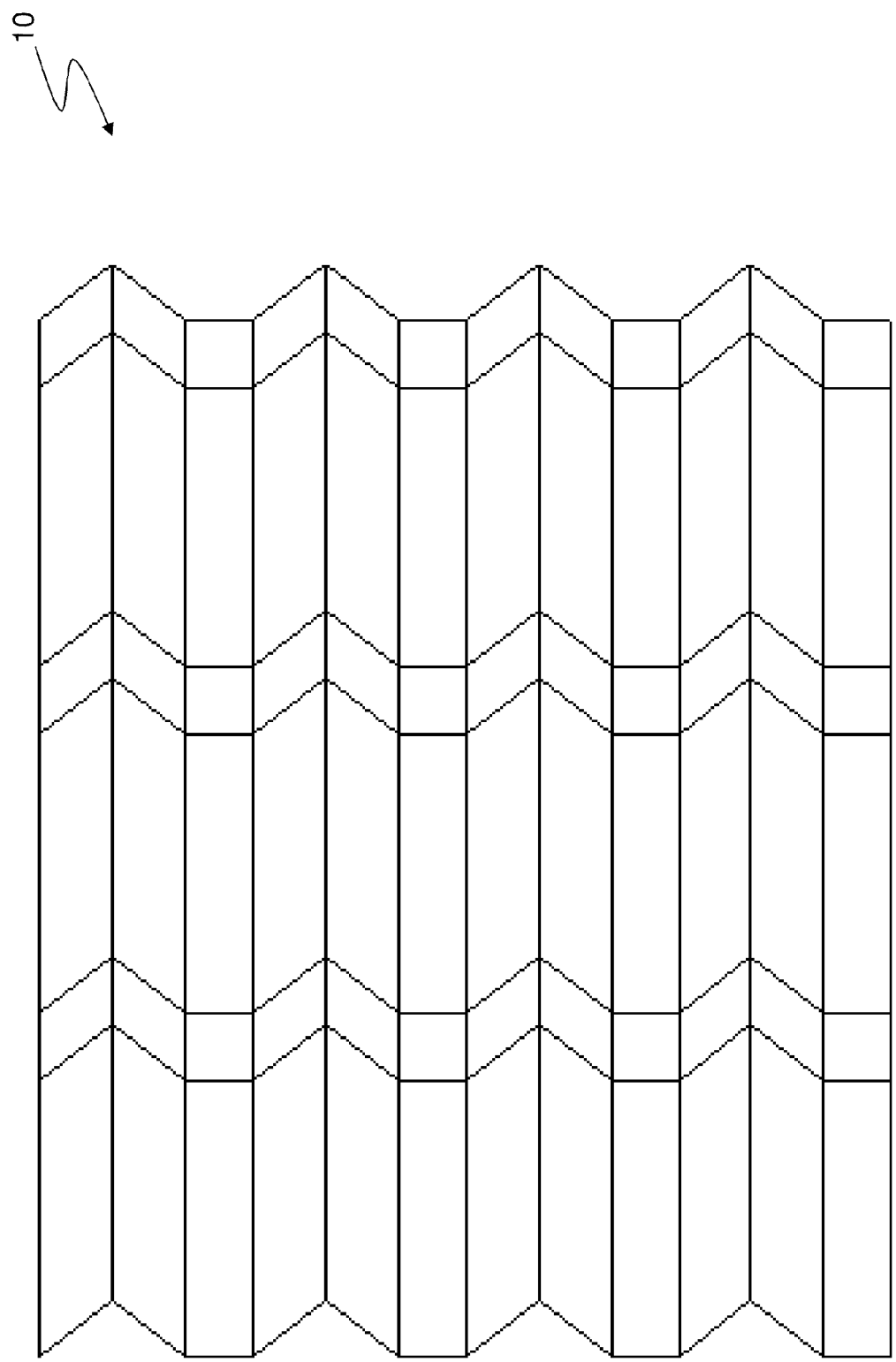
FIG. 1 illustrates a folding pattern with multiple internal vertices that may be used for an embodiment fixturing method.

Methods for providing sheet folding tessellations that produce a folded structure with a desired shape or characteristic are known, such as described in U.S. patent application Ser. No. 11/174,800 entitled "Patterning technology for folded sheet structures," filed on Jul. 5, 2005, the contents of which are incorporated herein by reference in their entirety, and in U.S. patent application Ser. No. 11/440,263 entitled "Folding methods, structures and apparatuses," filed on May 23, 2006, the contents of which are incorporated herein by reference in their entirety.

The sheet folding tessellations given by, for example, the above referenced patent applications, have many internal fold vertices. Fold vertices are the vertices in the sheet folding pattern, that is, where the fold edges (also called fold creases, or fold lines) meet the boundary of the pattern or meet with other fold edges. Internal fold vertices are fold vertices that are not on the perimeter of the sheet. Tessellation facets are those surfaces of the folding geometry that are bounded by fold edges and/or edges on the perimeter of the pattern. Each internal fold vertex is encircled by at least four fold edges, the angles formed by the fold edges summing to 360 degrees. In contrast to folding tessellations, standard box folding patterns and other common folding patterns have no internal vertices; rather, the vertices are all on the perimeter of the pattern, enabling fold lines to extend across the pattern. In these cases the individual folds may be manipulated independently from each other, and the fold pattern as a linkage does not have a single parameter of motion. Moreover, activating folds on one side of such sheets does not cause the folds to be activated on the other side of the sheet. On the other hand, the sheet folding tessellations as provided in the above-indicated patent applications are unusual in that they have many internal vertices, and by inducing folding on one edge of the tessellation the entire sheet will fold in unison. The significance of this for manipulating components in three-space is that the folding sheet tessellations offer a highly controllable linkage mechanism with a highly versatile designing methodology and completely known dynamics. Moreover, by activating the folding process anywhere on the sheet the entire sheet folds in unison. By attaching or fixturing a component to a region on the sheet, and in particular within a tessellation facet of the folding geometry, the rotational and translational movement of the region during the folding process is transferred to the component. Thus the folding tessellations of, for example, the above-indicated patent applications, give a fixturing device for manipulating multiple components with both completely known dynamics and a mechanically simplified control capability. This provides new design and operational capabilities. The same applies to other fold tessellations designed by other means where the folding pattern has multiple internal vertices reducing the folding capabilities to a dynamically controlled process.

By way of example, the methods and systems as disclosed in the above-indicated patent applications provide a process for designing suitable folding tessellations. These may be drawn on sheets of materials, which may then be etched or otherwise induced to fold along the prescribed fold edges, so that the resulting configuration will fold and unfold. The system may also be viewed as an architecture or plan for other functionally equivalent mechanical structures, with each region bounded by fold edges, i.e., tessellation facet, behaving as a rigid panel and the fold edges themselves acting as hinges between these regions. In this way the folding patterns may be viewed as sophisticated linkages, and in fact if linkages are constructed accordingly with rigid panels and piano hinges, for example, they will articulate with one parameter of motion as predicted by the folding process described in the above-indicated patent applications. The folding processes of the above-indicated patent applications are well-adapted to embodiments herein; other folding patterns may be designed, but in such cases it may be desirable that careful consideration be given to the design of the underlying sheet folding pattern, because the internal vertices in the pattern each impose constraints on the dynamics of the folding system and without precisely designed relationships these constraints may interact and cause the hinging to bind. In contrast, the patterns as provided by the above-indicated patents do not suffer from such concerns and thus are preferred though not necessarily required.

The folding geometries as provided by, for example, the above-indicated patent applications, may be interpreted as solutions to complex systems of linkage constraints. To illustrate the difficulty in finding generic sheet linkage patterns, suppose a tessellation has 10 by 10 vertices, quadrilateral regions and interior vertices of degree 4. This is also called a 10 by 10 mesh or array. The system has 180 constraints corresponding to the fixed lengths of the edges, 200 constraints corresponding to the rigidity of the quadrilaterals, 300 degrees of motion corresponding to the positions of the vertices, minus 6 degrees of motion for the rotation and translation of ambient three-space. This leaves a quadratic system of equations with 294 variables and 380 equations. For a generic pattern +1 degrees of freedom are needed to not bind as a linkage, and this example has a deficit of $-180-200+300-6=-86$ degrees of freedom. In particular it is therefore not easy to construct sheet linkages that do not bind when one tries to fold them. And in particular a sheet linkage system is very robust with numerous mechanical redundancies assuring the consistent transmission of the folding parameter across the sheet linkage.

A preferred embodiment uses the sheet folding geometries given by the above-indicated patent applications, or by other techniques, to provide solutions for linkage systems to design and embody them with one parameter of articulation so that they may serve as component fixturing and/or mounting systems for controlling the orchestrated simultaneous motion of multiple components. Another embodiment controls the motion of an array of periodically positioned components by attaching them to a folding tessellation in accordance with the periodicity of the tessellation, so that the tessellation's parameter of motion produces a uniform folding on the repeating units of the tessellation, and moves the components while preserving their periodicity during movement.

Figure 2:
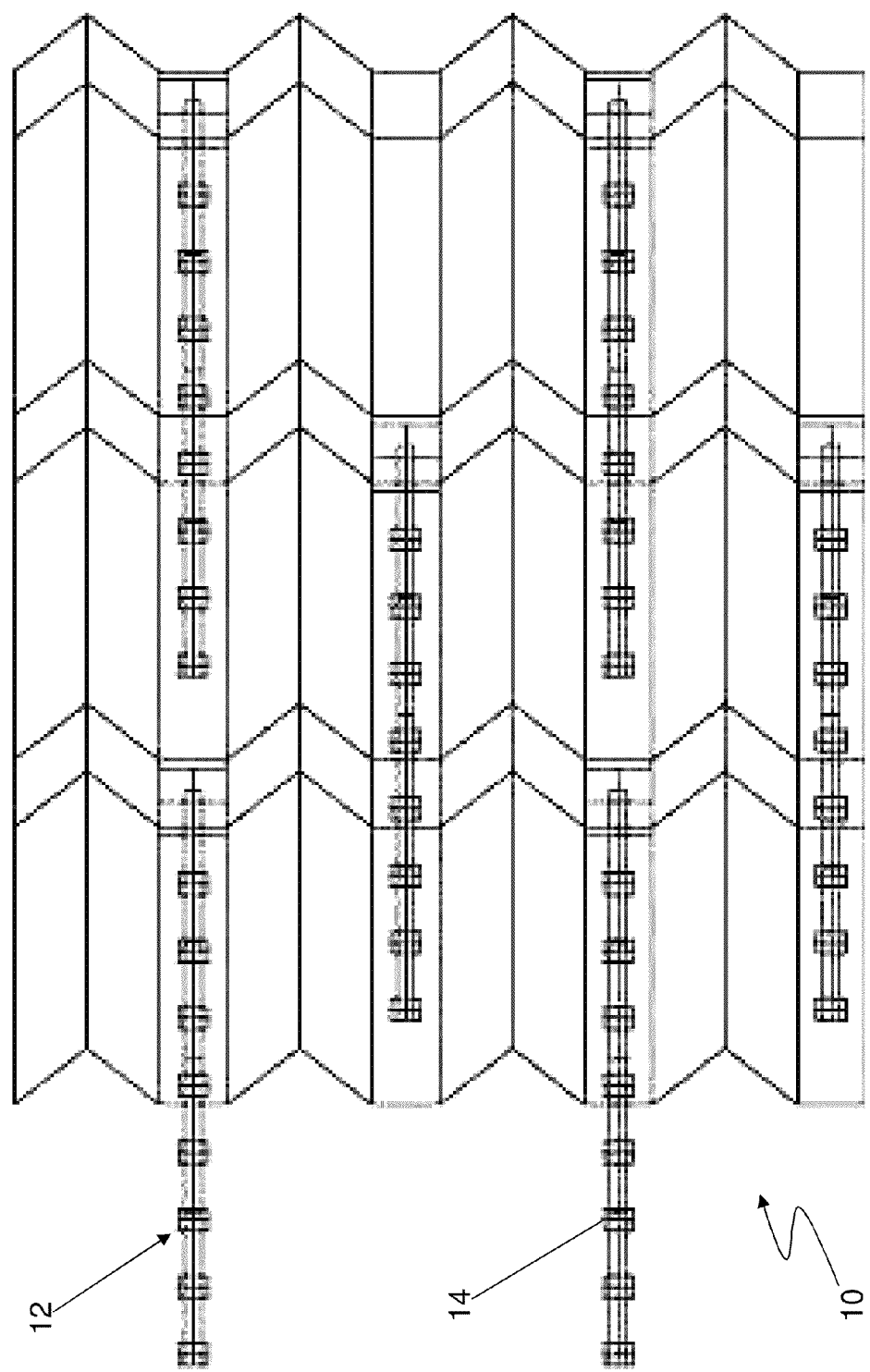
FIG. 2 illustrates the fixturing of components to a folding structure that folds in accordance with the folding pattern shown in FIG. 1.
Figure 3:
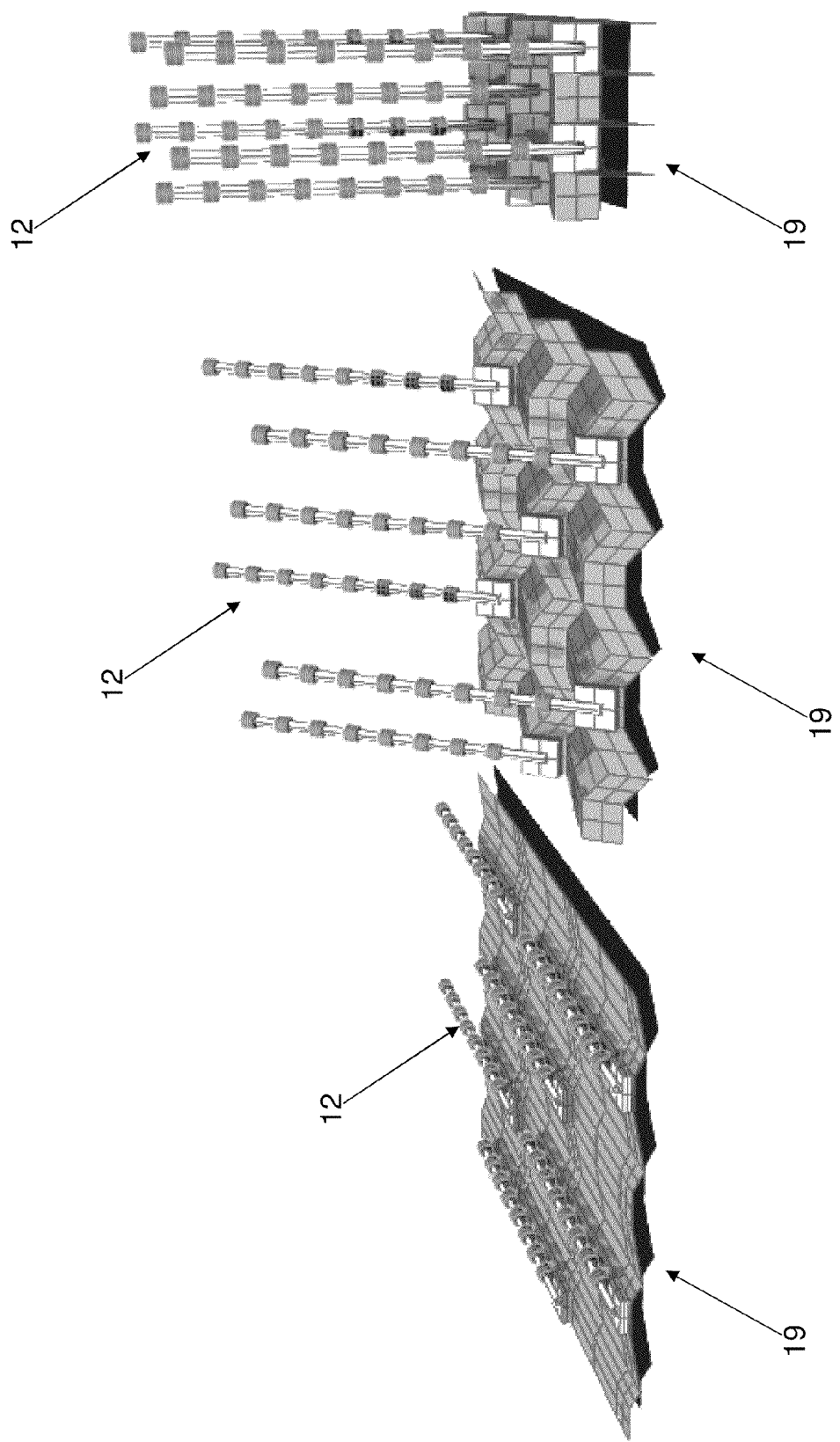
FIG. 3 is a perspective view showing various stages of folding of the structure shown in FIG. 2.

FIG. 1 shows an embodiment folding tessellation 10 used for such a purpose. In FIG. 2 masts 12 are fixtured to select regions of the tessellation 10. The cylindrical nodules along the masts may be receivers 14 for a phased array, for example. In this example an alternate selection of the repeating tessellation unit is used to produce a periodic placement of the masts 12 that is further spaced than the periodicity of the tessellation 10. FIG. 3 shows a sheet 19 that folds in accordance with the tessellation 10, the folding resulting in induced motion of the masts 12.

By way of example, a user may first determine the desired orientations and positions in space of the components, such as receivers 14 in a phased array or the like. Once the end configurations of the components are known, this may be used to determine the desired end-configuration of the corresponding respective mounting regions for the components. For example, the components may have a flat side for mounting or may be given a base with a flat mounting side, and this naturally corresponds to a desirable flat facet location on a folding surface, so that the component's flat side is tangent to its corresponding region on a flat mounting facet. For purposes of the following, and as indicated above, a "facet" or "tessellation facet" may be considered a region on the folding surface that is bounded by creases, fold lines, or the boundary of the pattern. Next, a corresponding folding pattern is designed. To design a sheet pattern that folds in a manner so as to position the mounting facets correctly, the methodology of the above-indicated patent applications may be used effectively. In this instance the mounting facet's position in three-space may be reduced to two two-dimensional cross-section choices. One cross section of the mounting facet will be a segment that may be defined to be a segment of the column cross-section (CCS). The other cross section of the mounting facet will be a segment that may be used for a segment of the row-cross section (RCS). The mounting facets corresponding to multiple components may be used to choose multiple segments in the CCS and RCS.

The selected segments corresponding to the cross-section of the mounting facets in the CCS may then be connected with additional segments to form a complete polygonal curve cross section CCS. The addition of these connecting segments gives the designer many choices that may impact the folding sequence of the CCS. The folding process described in the above-indicated patent applications may be applied to the CCS to study the dynamics of the trajectories of the full CCS and in particular the trajectories of the mounting-region cross-section segments. The segment translations and rotations will induce translations and rotations in the mounted component as seen in the column cross-section plane, and this enables a tailoring of the component cross-sectional movement by adapting the folding dynamics of the CCS.

Likewise the selected segments in the RCS may be connected with additional segments to form a complete polygonal curve cross section RCS. The addition of these connecting segments gives the designer many choices that may impact the folding sequence of the RCS. The folding process described in the above-indicated patent applications may be applied to the RCS to study the dynamics of the trajectories of the full RCS and in particular the trajectories of the mounting region row-section segments. The segment translations and rotations will induce translations and rotations in the mounted component as seen in the row cross-section plane, and this enables a tailoring of the component cross-sectional movement by adapting the folding dynamics of the RCS.

Together the row and column cross-sectional trajectories give a full description of the three-dimensional trajectories of the folding sheet and in particular its mounting facets. The translations and rotations in three-space of these mounting regions will induce translations and rotations in the mounted component as seen in three-space. This is fully determined using the three-dimensional folding algorithm disclosed in, for example, the above-indicated patent application Ser. No. 11/174,800. This permits engineering of both the component three-dimensional movement and final positioning by utilizing the folding algorithm to tailor the dynamics of the CCS and RCS.

By way of example, the design process may be illustrated in an embodiment where it is desired to construct a flat sheet with louvers fixtured to it, and fold the sheet into a cylindrical structure so that the louvers emanate out radially from the cylinder axis and are on a 45-degree angle to the cylinder base plane. This embodiment illustrates, simply by way of example, a new manufacturing capability for specialty filters, small self-assembly turbines, and other products.

Figure 16:
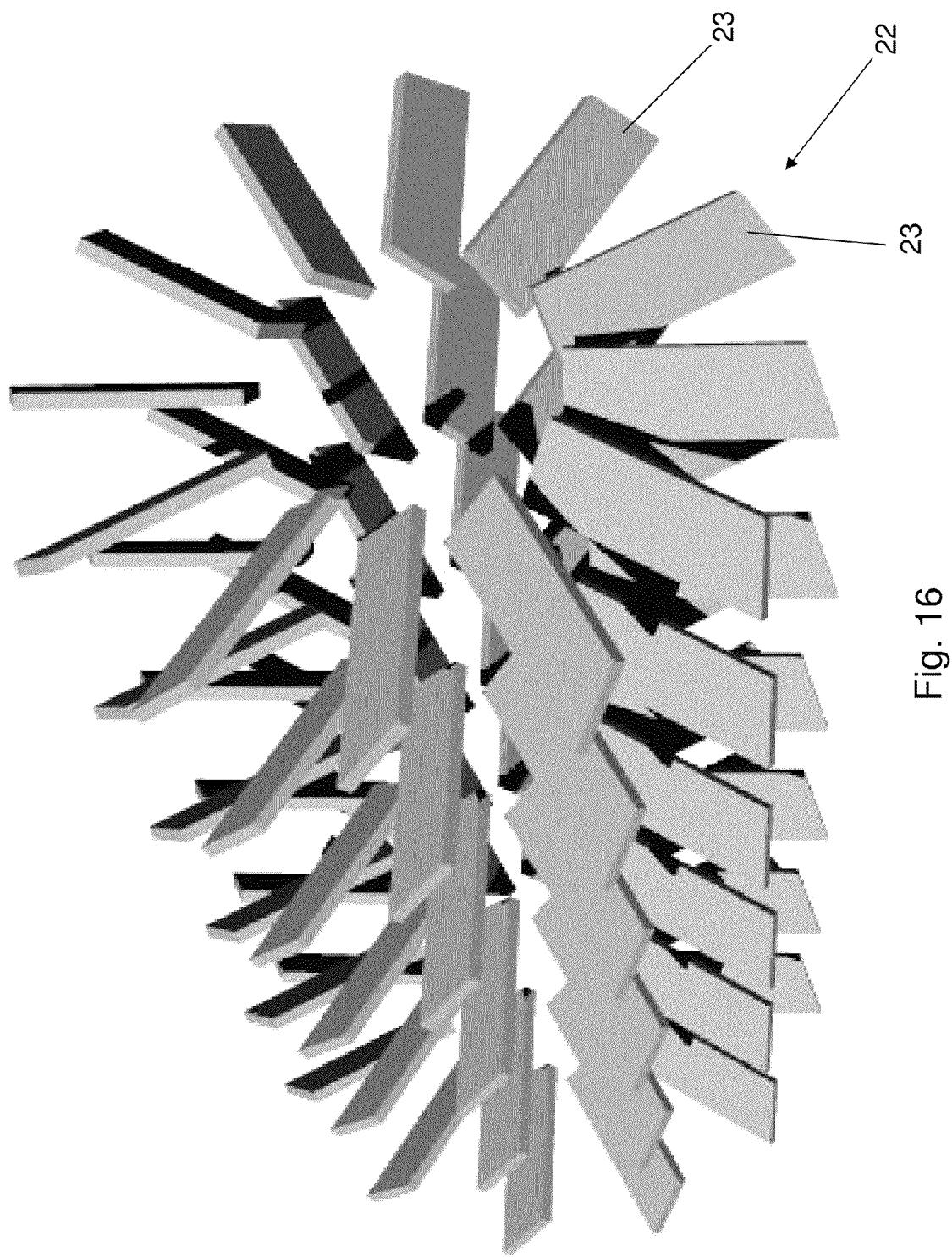
FIG. 16 is a perspective view illustrating a desired placement and orientation of components in space.

The sought-for radial configuration of louvers 22 is shown in FIG. 16, with six stacked rings, and 12 louvers 22 per ring. This is an initial condition imposed by, for example, the desires of the user or some other design constraint. Then, using these initial conditions an embodiment method may be employed to find a suitable corresponding folding pattern that will position the elements, lovers 22 in the case, as required by the initial conditions. A tangent surface of a louver 22 may be selected to define the plane of its mounting facet. In this example the front face 27 near the circumferentially outer end of the louver 22 is selected. Since the louvers 22 emanate radially this tangential region 23 has a radial center-cross-section, suggesting a CCS with radial segments and a period 12 axial symmetry. One such choice is shown in FIG. 9 with one of the radial segments shown in boldface.

Figure 10:
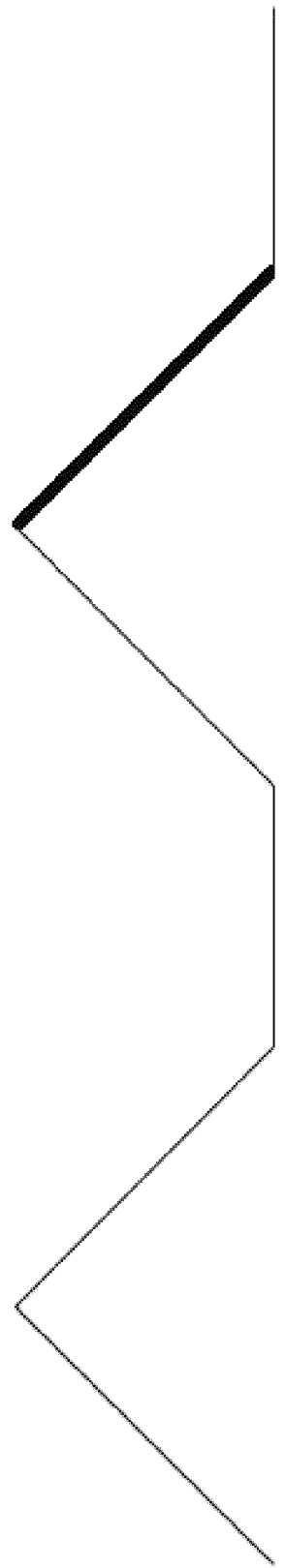
FIG. 10 illustrates an embodiment row cross-section pattern for a preferred embodiment folding pattern generation method.

Next an RCS polygonal curve may be selected. Since the louvers 22 have a 45 degree pitch in a preferred embodiment the wave choice for the RCS will have a 45 degree slope. In an alternative embodiment the louvers may be given mounting bases to interface between the louvers and the mounting facets creating the desired tangency regions. In FIG. 10 one choice of RCS has been selected with a bold face line indicating the segment corresponding to the cross-section for a mounting facet with 45 degree pitch.

Figure 9:
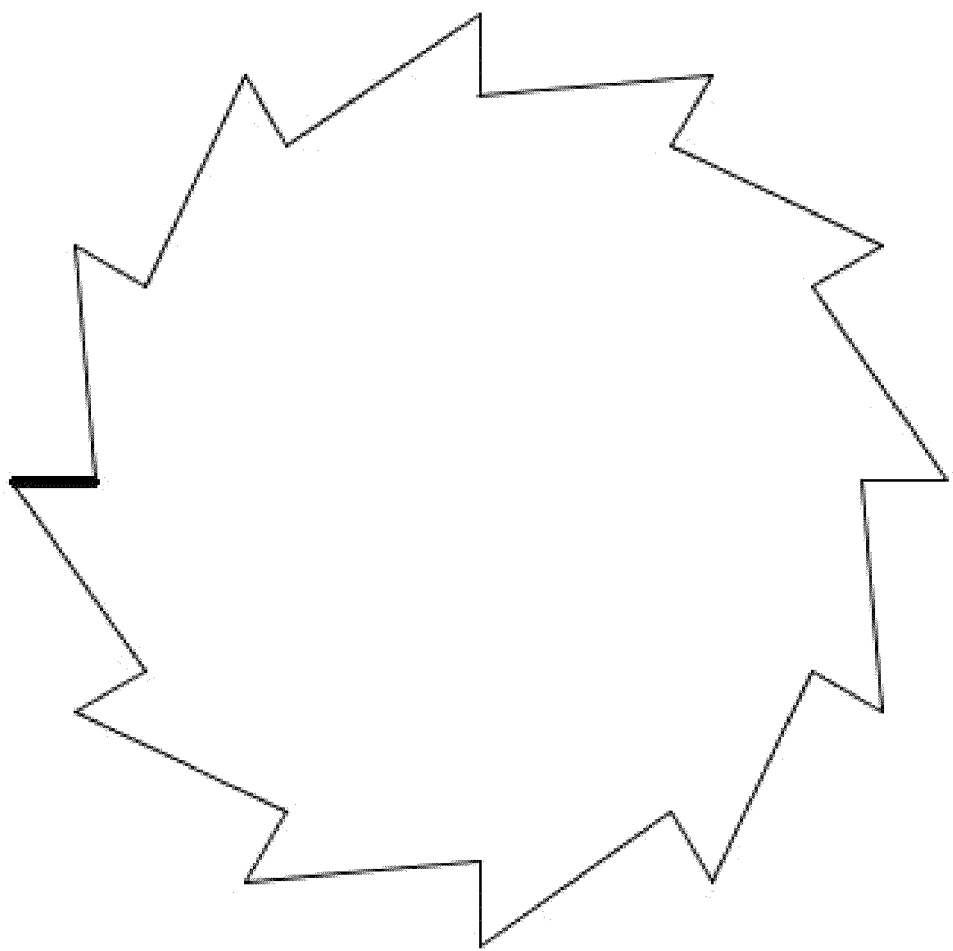
FIG. 9 illustrates an embodiment column cross-section pattern for a preferred embodiment folding pattern generation method.

The CCS and RCS of FIGS. 9 and 10, respectively, may then be applied in the Two Cross-Section Algorithm discussed in U.S. patent application Ser. No. 11/174,800 to generate the surface 29 shown in FIG. 11. The folded surface 29 with the attached louvers 22 is shown in FIG. 12. Some scaling or trimming of the louvers 22 may be preferred to assure they can be attached to the mounting regions without interference between each other or with neighboring regions of the folded sheet 29. In some cases it may be preferred to cut holes in the sheet 29 or to use mounting bases to eliminate interference.

Figure 11:
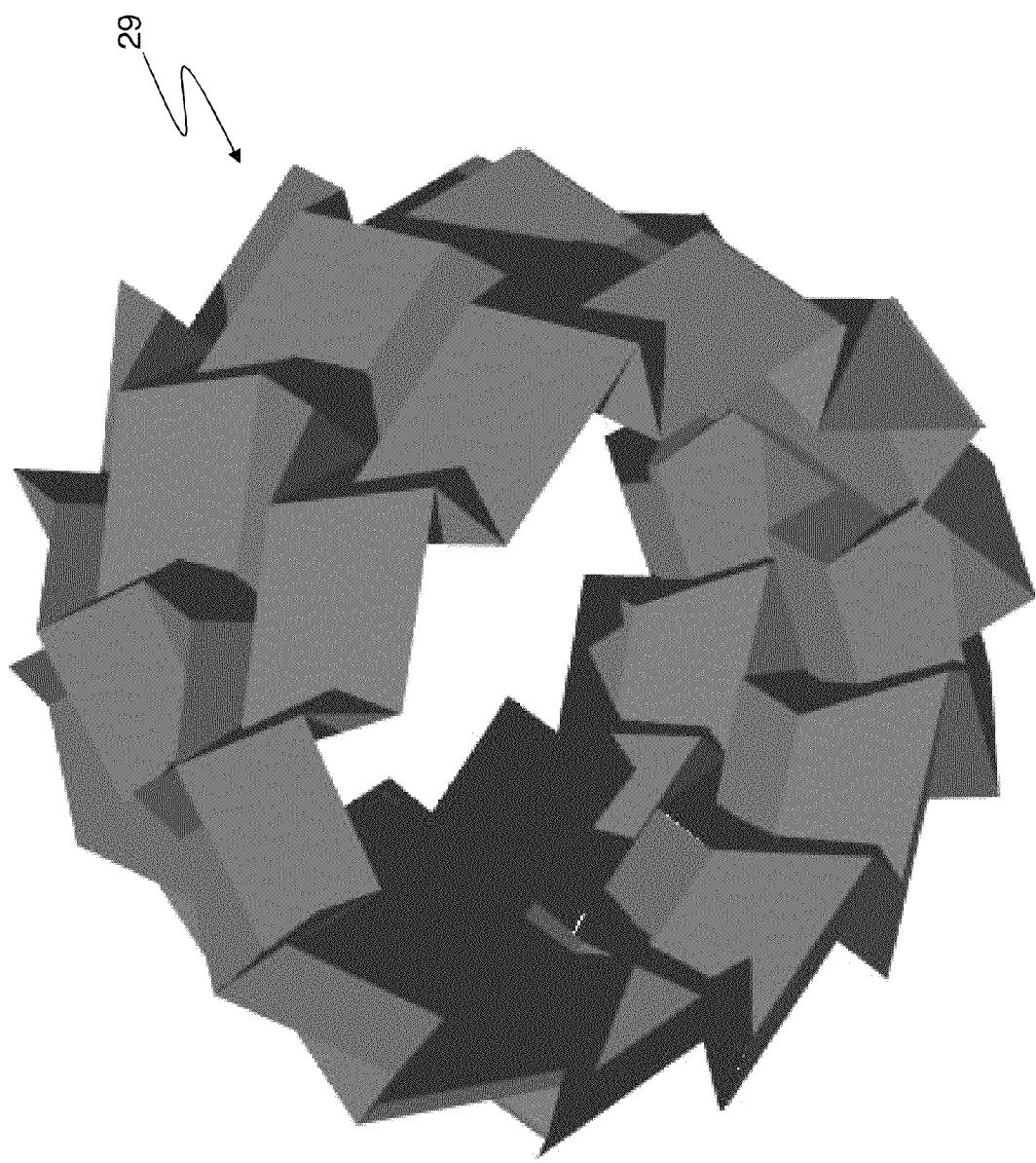
FIG. 11 is a perspective view of a folding geometry generated using the patterns shown in FIGS. 9 and 10.
Figure 12:
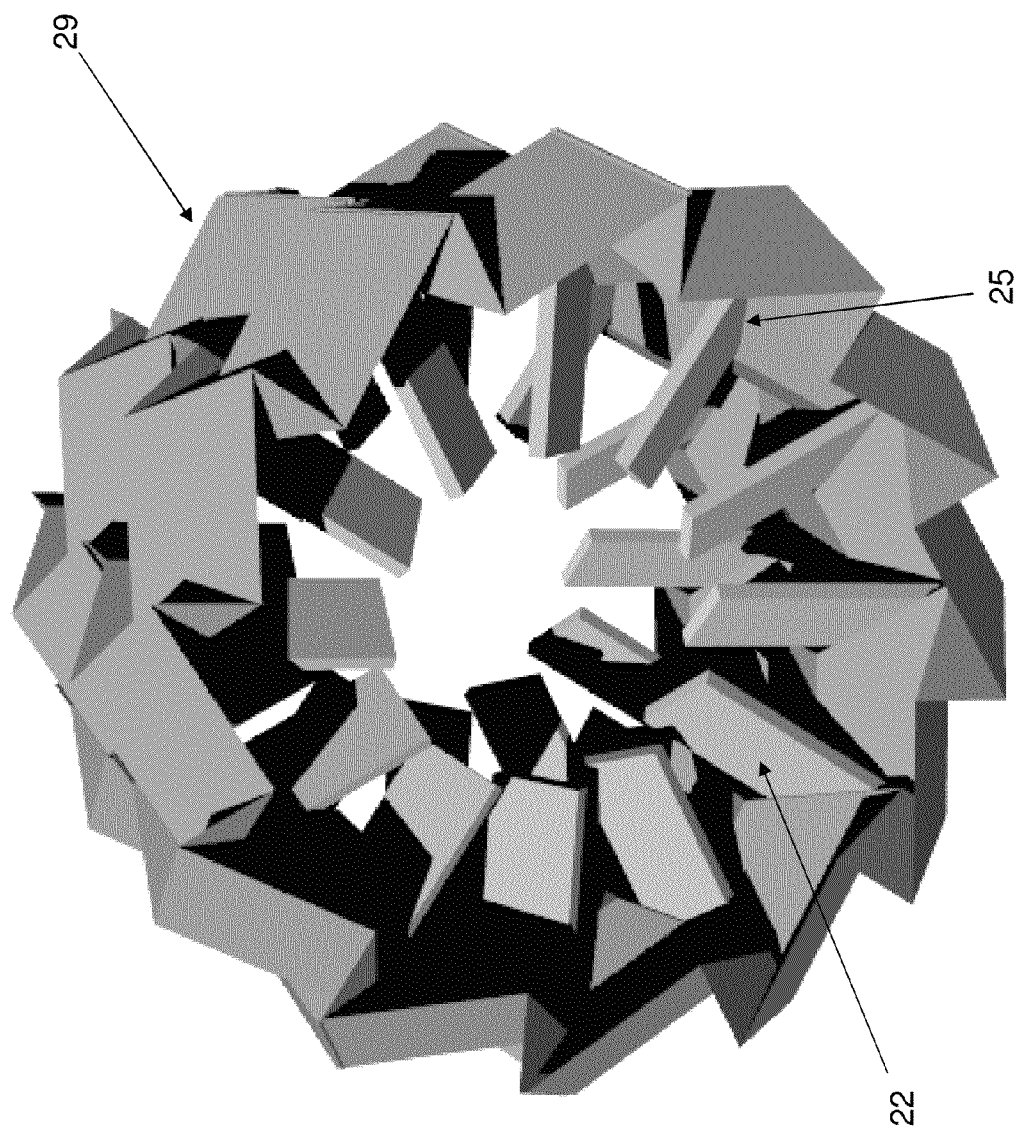
FIG. 12 is a perspective view of the components attached to a structure that folds in accordance with the pattern shown in FIG. 11, in accordance with an embodiment fixturing method.
Figure 13:
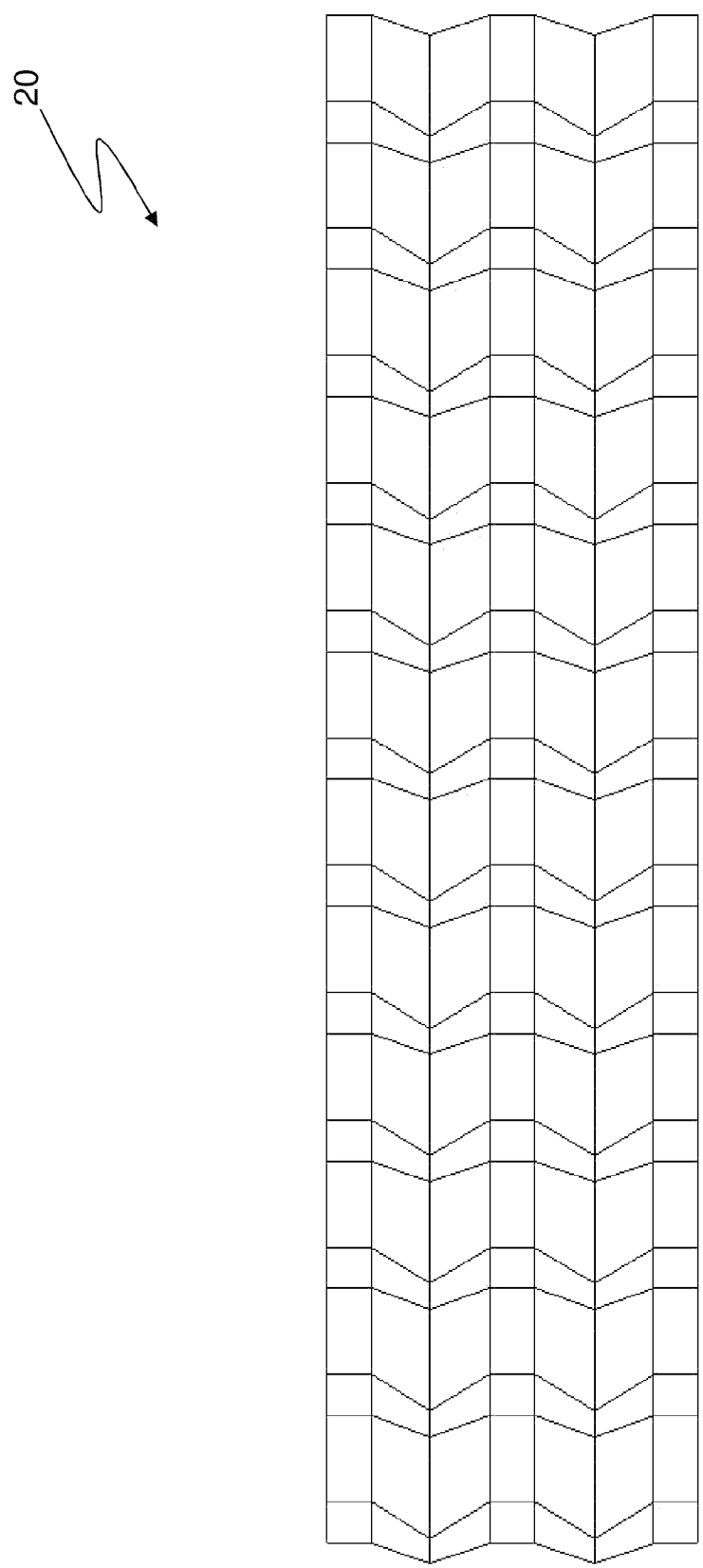
FIG. 13 shows the folding tessellation pattern of the folding geometry indicated in FIG. 11.
Figure 14:
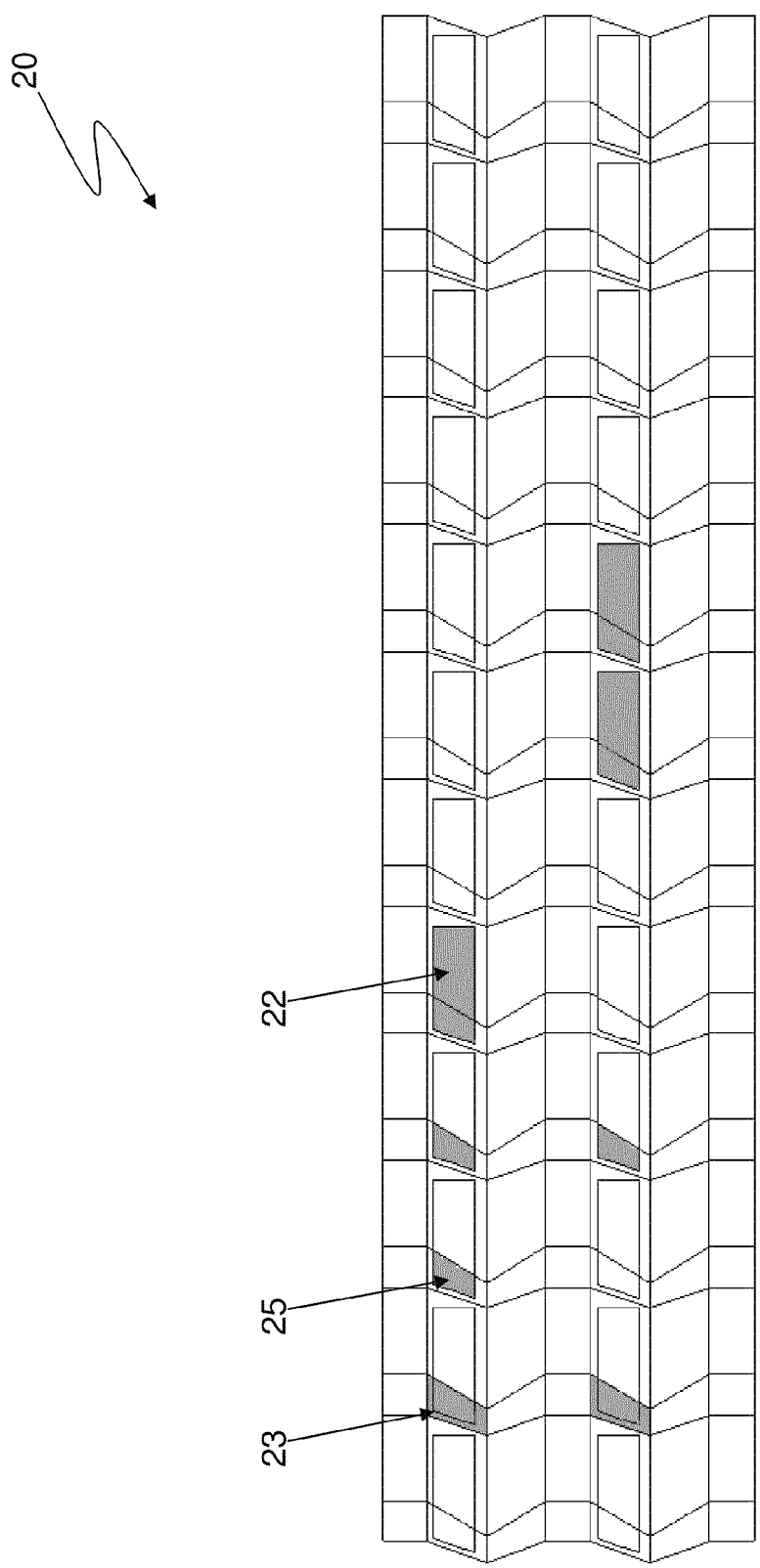
FIG. 14 illustrates the placement of components to mounting facets for the tessellation of FIG. 13.
Figure 15:
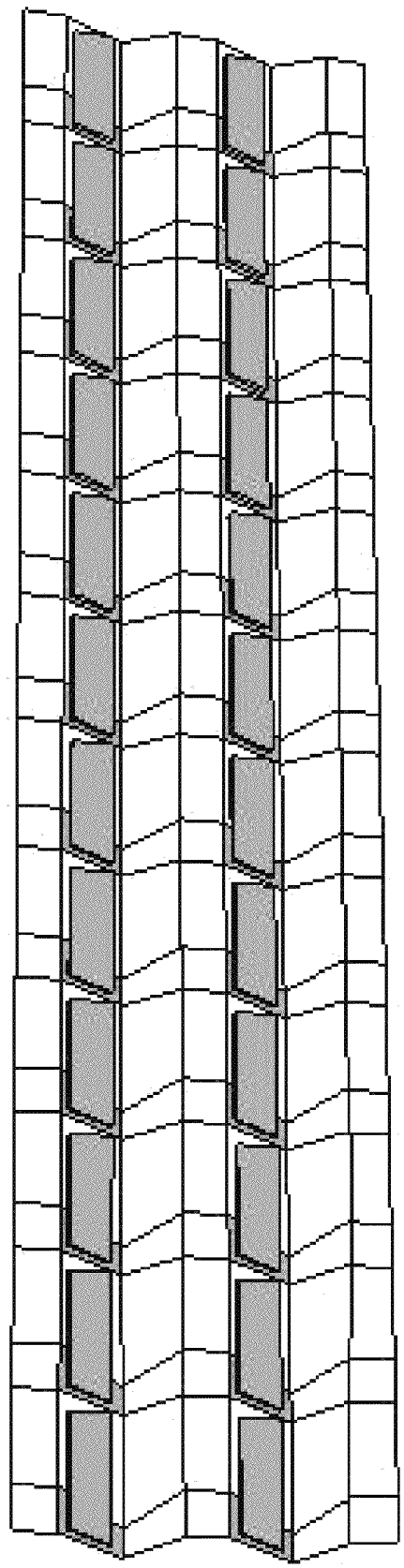
FIG. 15 shows the complete placement of all components onto a structure having the tessellation pattern indicated in FIG. 13.

By applying the methods of the above-indicated patent applications, the folded pattern 29 in FIG. 11 is seen to unfold into the tessellation shown in FIG. 13. Following back the louver 22 position from FIG. 12 by applying the rigid motion to the louvers 22 that preserves their fixturing to the mounting regions, one sees the unfolded sheet 29 with attached louvers 22 as shown in FIG. 15. In FIG. 14, a few mounting facets 23, mounting regions 25, and louvers 22 are shown and understood to extend across the repeating pattern 20.

Figure 17:
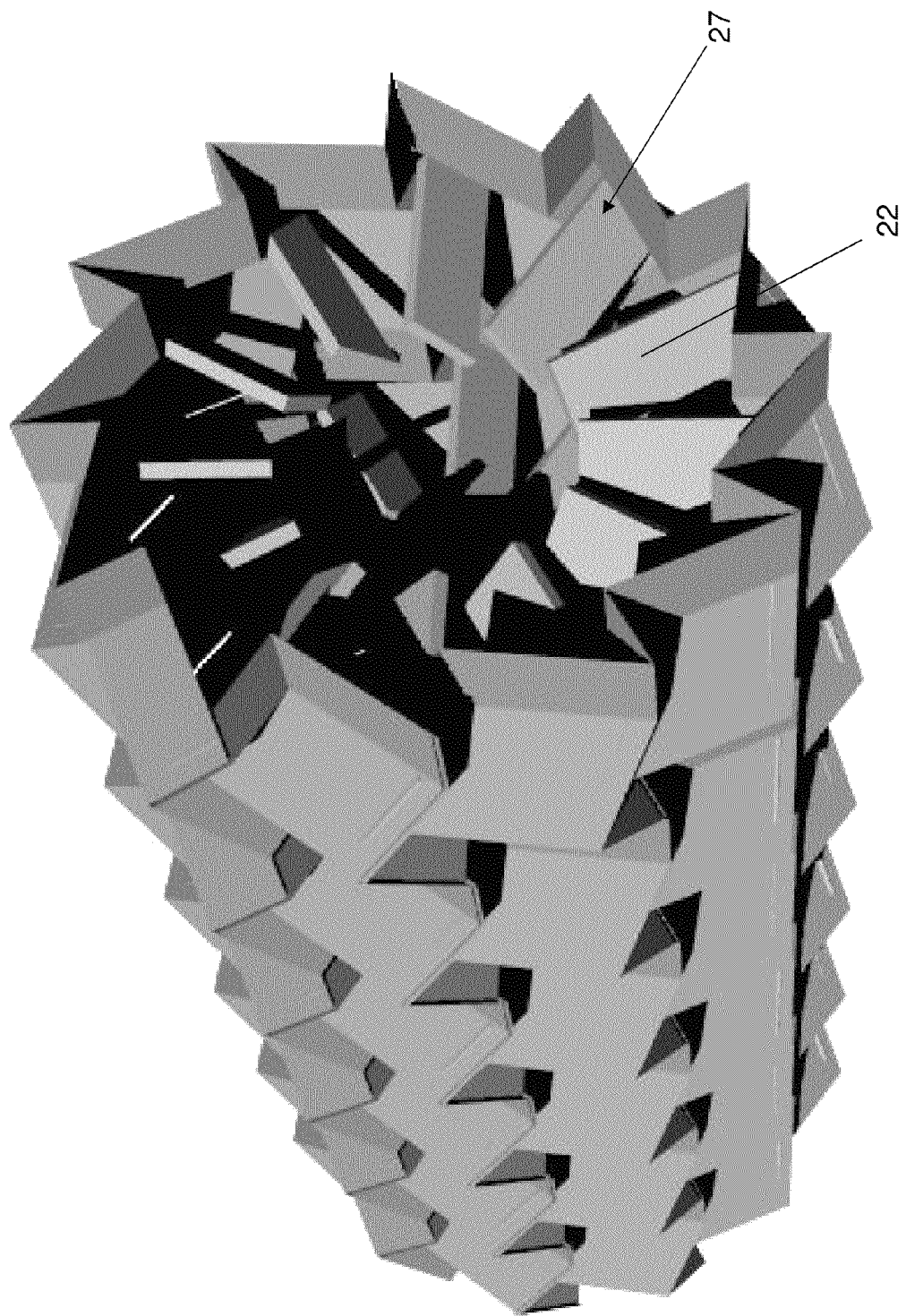
FIG. 17 is a perspective view of an embodiment fixturing method that satisfies the position and orientation conditions illustrated in FIG. 16.

In FIG. 17 the same pattern 20 has been folded with more repetitions in the row direction. This is the folded geometry desired from the initial task of producing the louver 22 configuration of FIG. 16. The CCS in FIG. 9 remains unchanged, while the RCS in FIG. 11 changes from showing two repetitions of the wave type to having six repetitions. To correspond to FIG. 17, FIGS. 13 and 15 for the unfolded pattern would be repeated three times in the vertical page direction of the drawings.

It will be appreciated that various embodiments may apply across many scales, materials and applications. By way of example, in FIG. 2 the tessellation 10 and masts 12 may be nano-scaled and manufactured by a two-dimensional building process such as lithography. The sheet 19 may then be folded by a self-assembly processes using chemical baths and surface tension. The sheet 19 may have other electrical components incorporated into its design. The two-dimensional printing of the masts 12, receivers 14, and additional electrical components with a self-assembly process for erecting the masts 12 offers distinct advantages over existing fabrication procedures.

Alternatively, FIG. 2 may also be a very large array that is deployed in space. Such three-dimensional arrays of receivers 14 are valuable for very high-resolution phased array antenna systems. Because it is assembled on a sheet 19, the arrangement in FIG. 2 may be rolled on a coil, z-folded, or otherwise packed efficiently for transport to space. Once in space the sheet 19 may be unpacked into its flat configuration, and then deployed by activating the folding sequence shown in FIG. 3. The deployment mechanism may be memory hinges, mechanical activation, or any other suitable means. Of significant advantage is the uniform single step shown in FIG. 3 for erecting the masts 12. Furthermore, as the linkage equations resulting from the folding tessellation 10 give a one-parameter folding operation, and yet have many more constraints than needed to control the translation and rotation of the tessellation regions, there is a great redundancy to the linkage geometry and the system is thus highly robust, offering a smooth deployment process.

For polypropylene or other flexible sheet materials it may be satisfactory to design sheet tessellations with folding solutions that are only approximately derived from the algebraic system of polygonal linkage equations. In these cases the facets may distort slightly from their planar form, or the fold locations may roll slightly on the sheet material. With these and other variations the solution will generally take the least energy configuration, and the resulting folding dynamics may globally act as required with controllable articulation and component trajectory determination.

Figure 18:
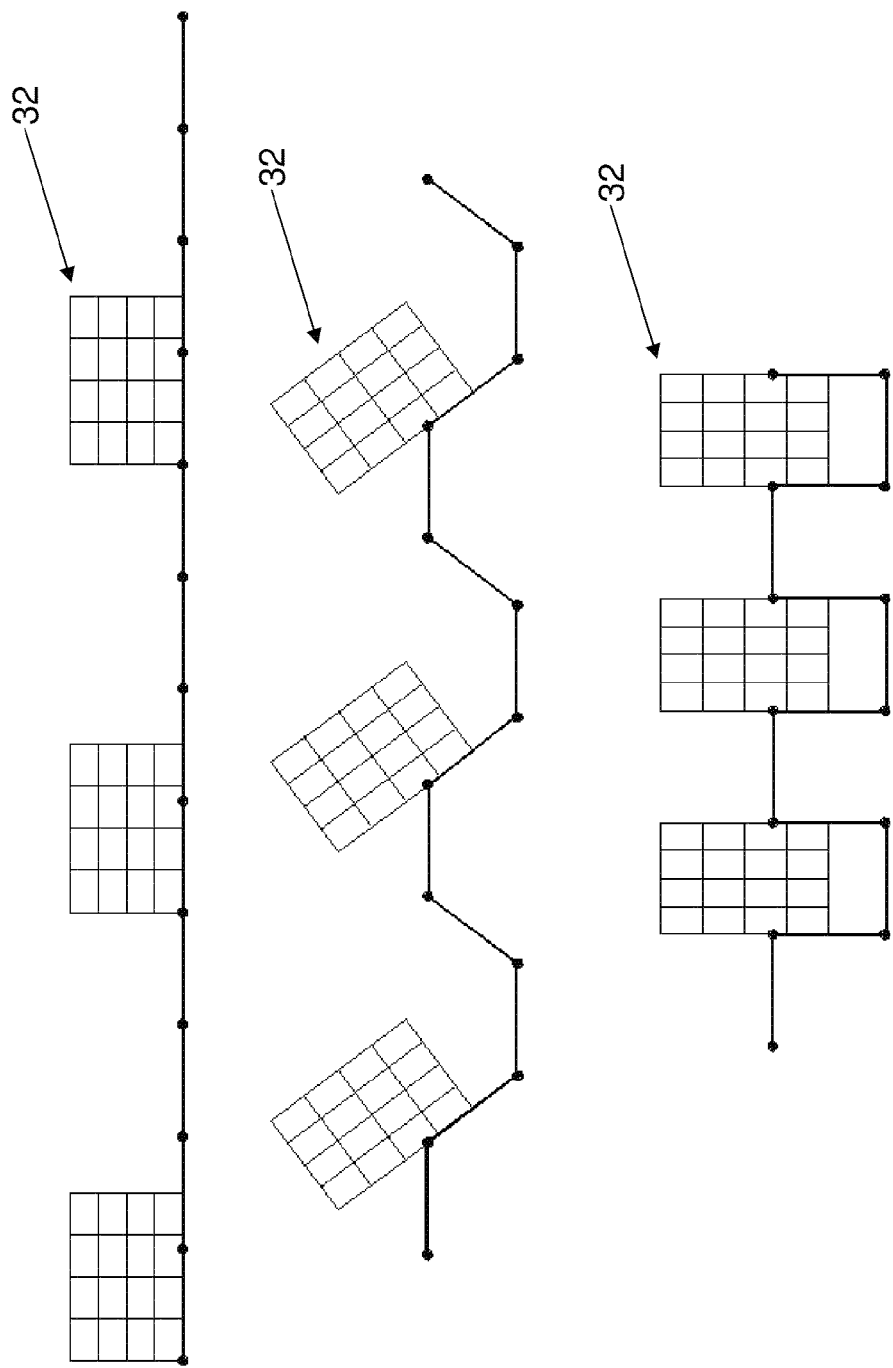
FIG. 18 illustrates the locking of components' when folding occurs in accordance with an embodiment fixturing method.

There are many variations. The folding geometry may be used to define the overall trajectories of the facets and mounted components, and then selected fold hinging can be replaced with similar functioning hardware. Holes may be cut into the facets for weight reduction or other advantages. Pieces from multiple folding sheet tessellations may be combined together to create composite linkages. In some embodiments the components may be only temporarily secured to the mounting facets. In other embodiments the components may be attached to multiple facets by enabling their bases to articulate with the movement of their anchor points, such as with universal joints or the like. Multiple components may be attached to the same mounting facet. In other embodiments the components may be initially attached to one set of mounting facets, and then in a final folding position they come in contact with additional facets and these used to further secure the component. This may be done readily by using, for example, the square wave for the RCS or CCS wave. FIG. 18 shows an example that may be applied for both the RCS or the CCS. The boxed region 32 represents the component or its fixturing base.

Figure 8A:
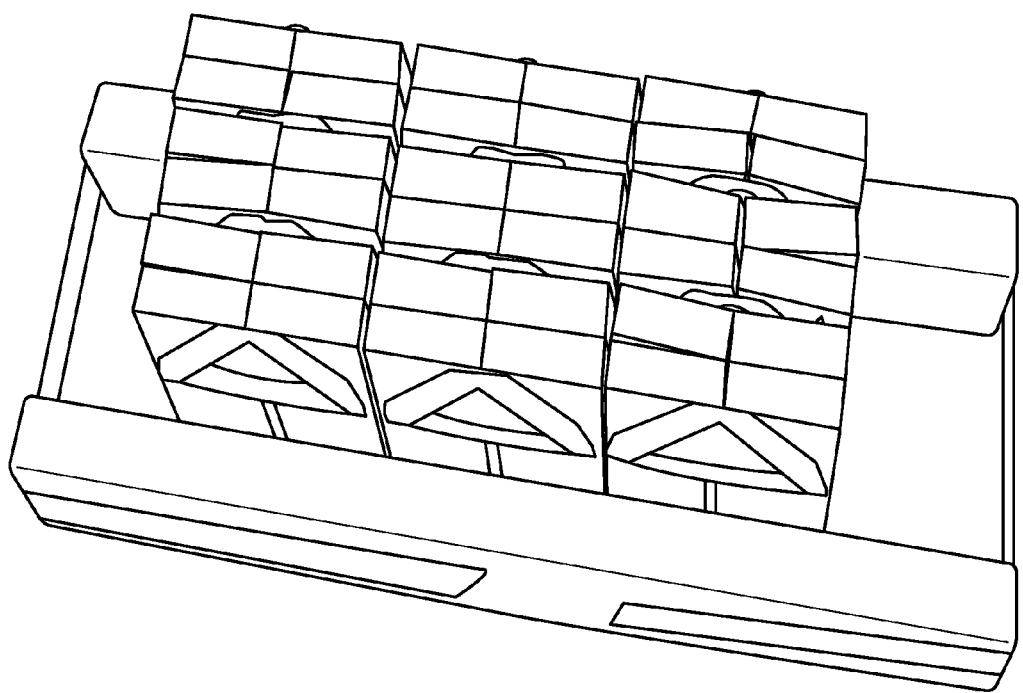
FIGS. 8A-8C are photographs of an embodiment folding slab in various stages of folding.
Figure 8B:
Figure 8C:
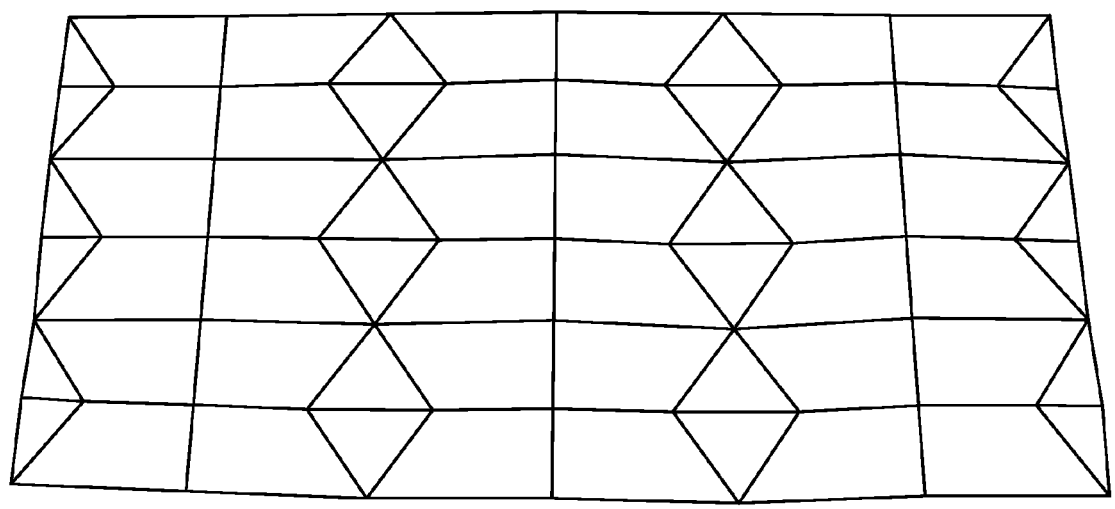

A preferred embodiment combines multiple applications of attaching components, which may be thick slab components, to folding tessellations to produce a thickened folding slab. For purposes of the following, a thick slab may be considered any substantially planar material that cannot be adequately modeled as an infinitely thin plane, or cannot otherwise be folded without substantial distortion or damage to the slab material. In a thick slab, it is therefore necessary to use a hinging means, such as a piano hinge, a bendable material, webbing, or any other suitable means as known in the art, to facilitate a folding action between two or more slab components. Moreover the slab thickness necessitates that the hinging axis cannot be in the middle plane of the slab, and generally the hinge axis is preferred to lie on one or the other faces of the slab as is done, for example, in the common door. Such embodiments provide the ability to fold up a thick panel so that it contracts simultaneously in both plane directions. FIG. 8C shows an example of such a flat slab, with an intermediate folding state presented in FIG. 8B, and a fully folded form in FIG. 8A. This folding technique for a thick slab may be used for many applications, including the design of a deployable phased array in space, where large sheets are needed to pack efficiently in transport bays and deploy by expanding in multiple directions into a plane structure of moderate thickness.

Figure 4:
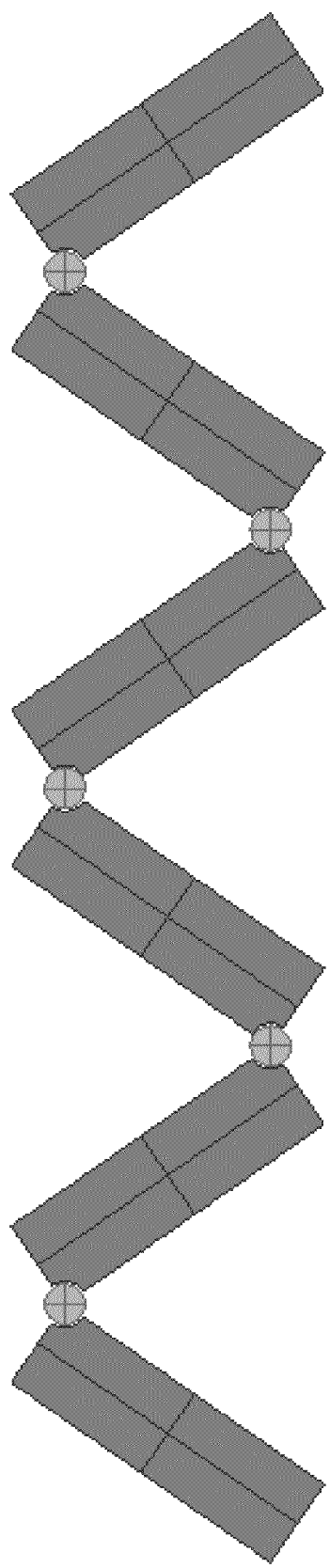
FIG. 4 illustrates a method for hinging blocks together to form a folding slab.

Of course the methods of the above-indicated patent applications, such as application Ser. No. 11/174,800, may be used to design many folding patterns that expand in multiple directions for thin sheets. To understand the significance for designing folding patterns for thick sheets, first note that in the simple one-directional case the hinges between panel regions would generally be placed alternately on the upper or lower face of the panel, based on the fold convexity of the pattern, to enable folding as shown in FIG. 4. The construction in FIG. 4 will extend out completely to form a solid slab and fold up completely to form a solid stack of panels, but it folds in only one direction.

For a folding pattern to contract in multiple directions it is desirable for it to have many internal vertices. To initiate the pleating process each internal vertex must have some adjacent fold edges in both fold convexities, namely some crease valleys and some crease ridges all coincident at the vertex. Consequently if hinges where installed as in the one-directional case of FIG. 4, some hinge axis would lie on the top face of the slab and some would lie on the bottom face. This means the hinge axes are not all coincident with a single fold vertex point. This in turn causes the linkage geometry to bind when folded.

Figure 19:
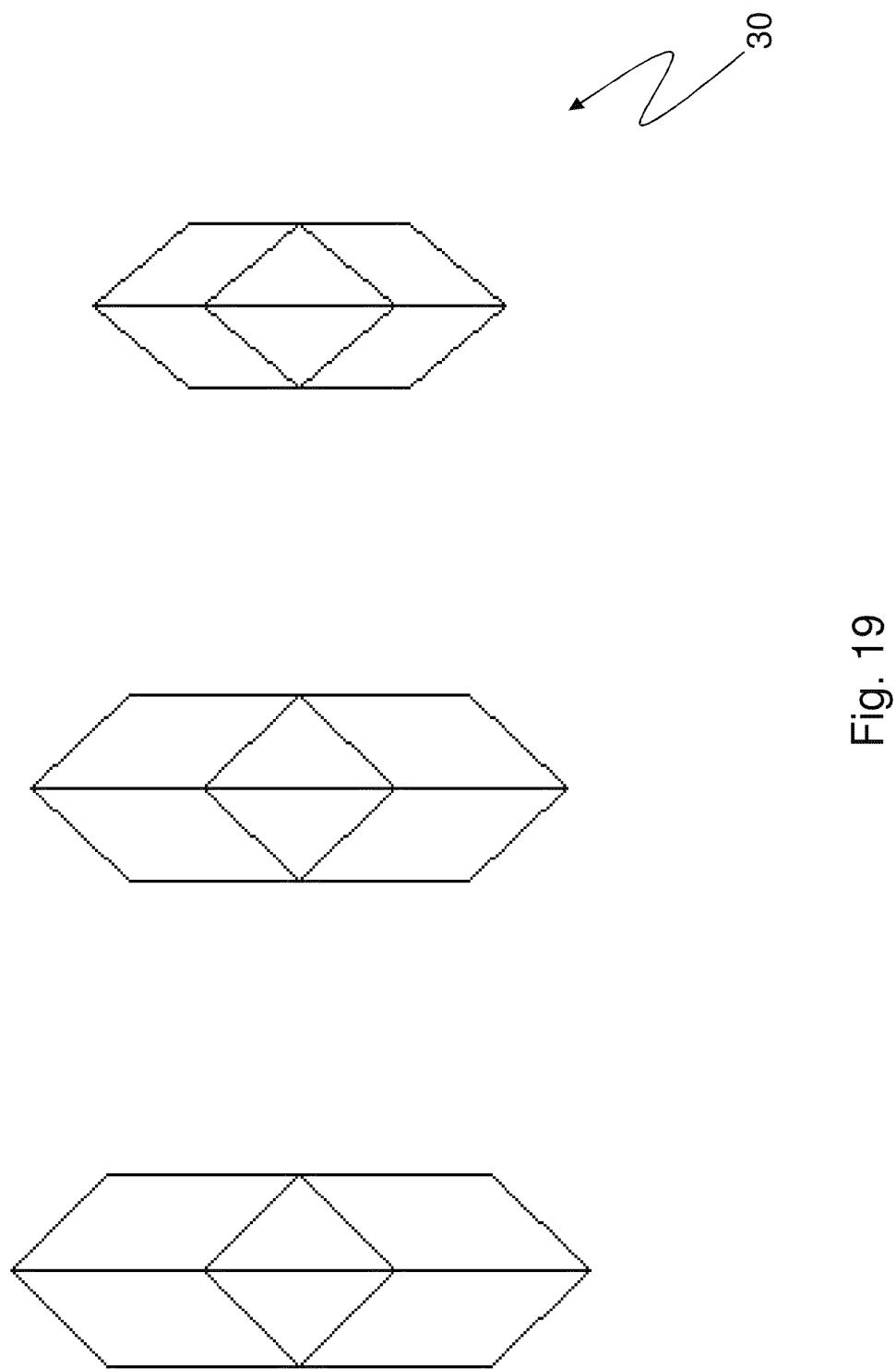
FIG. 19 is a top view illustrating folding progression of an embodiment folding geometry.
Figure 20:
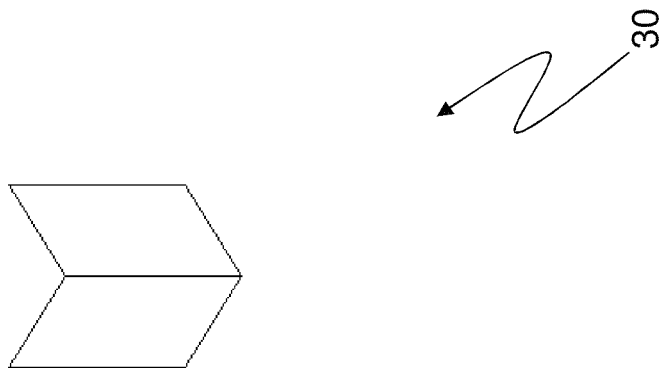
FIG. 20 is a side view illustrating folding progression of the folding geometry indicated in FIG. 19.
Figure 21:
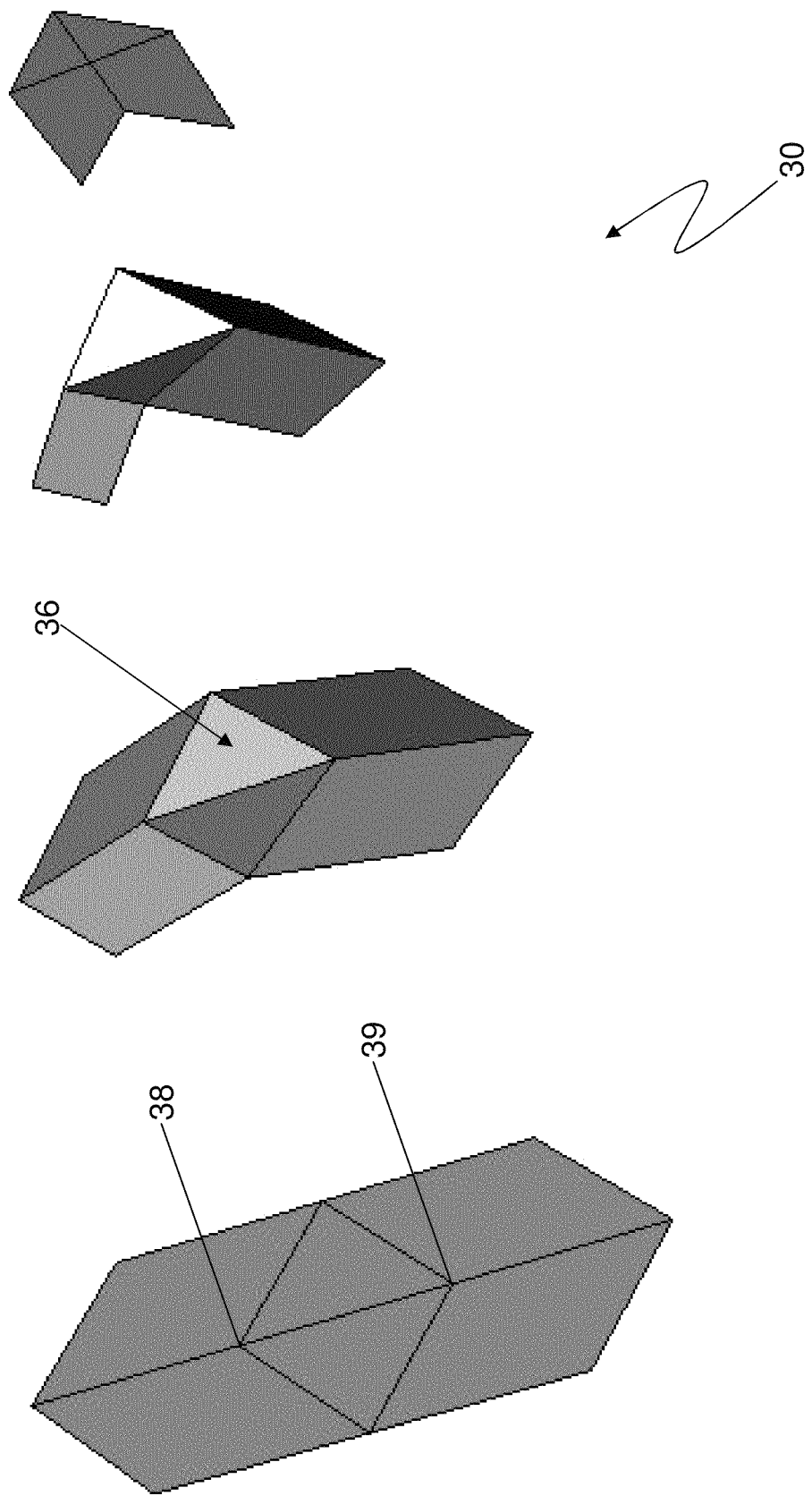
FIG. 21 is a perspective view illustrating folding progression of the folding geometry indicated in FIG. 19.
Figure 23:
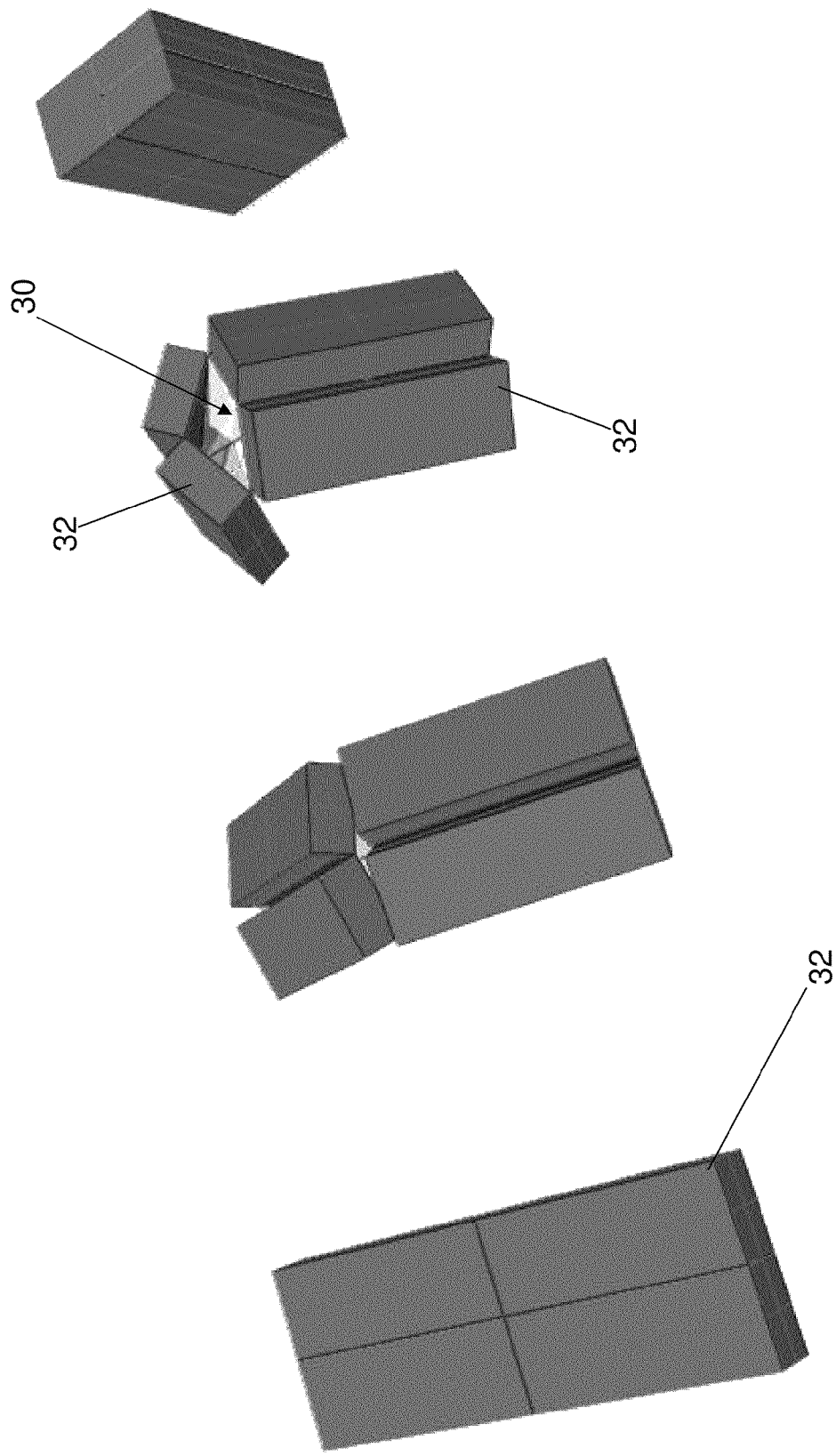
FIG. 23 illustrates fixturing of block components in accordance with an embodiment method utilizing the folding geometry shown in FIGS. 19-22.

To overcome the binding problem, several embodiments of the present invention may be applied to collectively produce a folding thick slab. FIG. 21 shows a perspective view of a folding tessellation 30 with two internal vertices 38, 39. The crease between vertices 38 and 39 forms a valley fold, while the creases extending externally from vertices 38 and 39 form respective ridge folds. This valley fold forms a diamond region 36. Four stages of folding are positioned in three-space. The leftmost is fully unfolded and the rightmost is fully folded. The same stages in the same relative positioning are shown in top view in FIG. 19, in side view in FIG. 20, and in end view in the first frame of FIG. 22. The remaining four frames of FIG. 22 show the folding stages offset from the spatial arrangement of FIG. 21 to see them individually. FIG. 23 shows an embodiment of the present invention using the tessellation 30 from FIG. 21 to orchestrate the simultaneous movement of four rectangular blocks 32. Notice that the blocks 32 form a flat slab in the first frame and gradually and uniformly fold up to a solid block in the last frame.

By comparing the motion of the blocks in FIG. 23 to the images in FIG. 8 it is clear that several instances of FIG. 23 occur in FIG. 8. In particular, a mid-folding frame with the diamond opening occurring between the four blocks is easy to see in both images. Note that by flipping the four-blocks-configuration over so that the diamond opening would point downward, this also occurs repeatedly in FIG. 8. In FIG. 8 the exposed connecting triangles hiding the diamond opening below them are the triangles that form the diamond opening 36 of the tessellation in FIG. 21.

Figure 24:
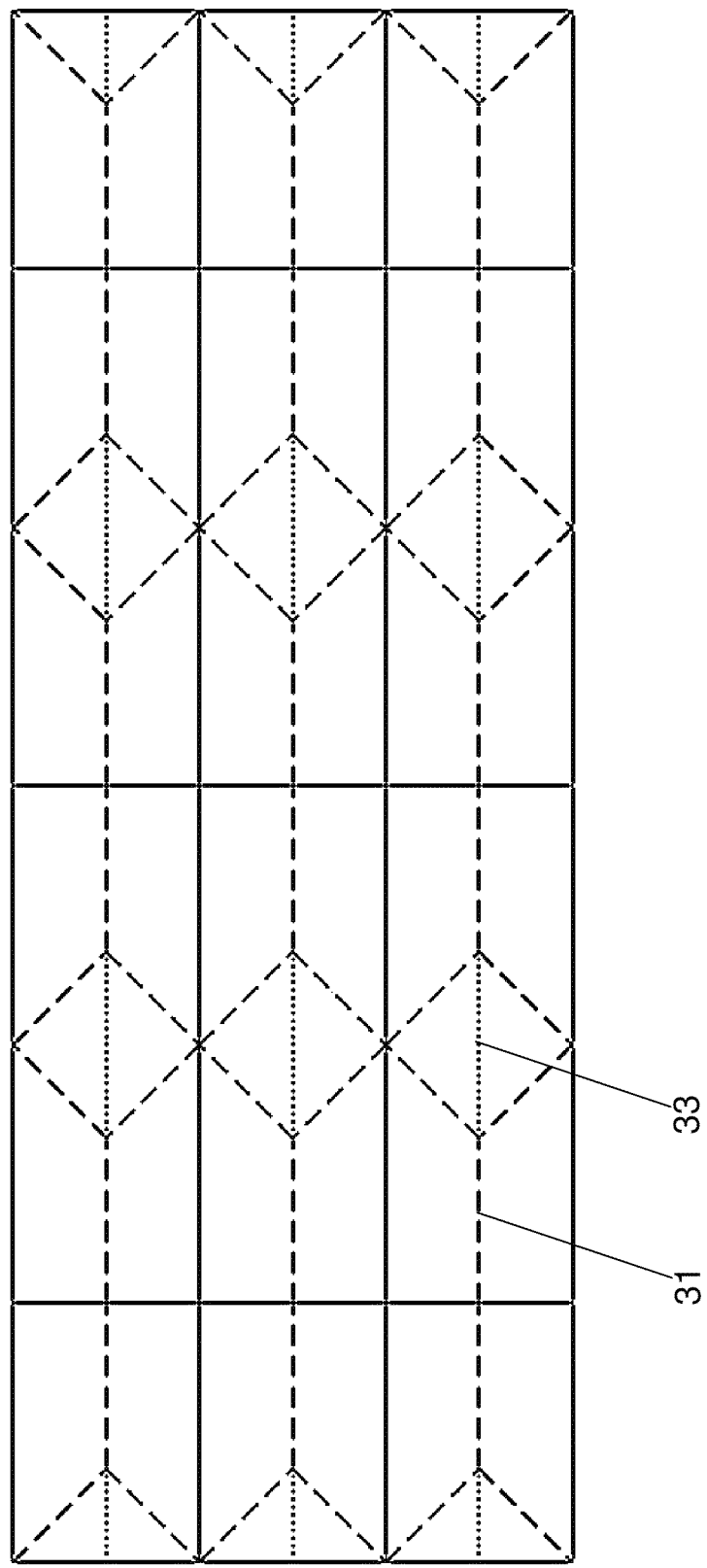
FIG. 24 shows a tessellation pattern for an embodiment fixturing method for a bottom sheet or folding mechanisms.
Figure 25:
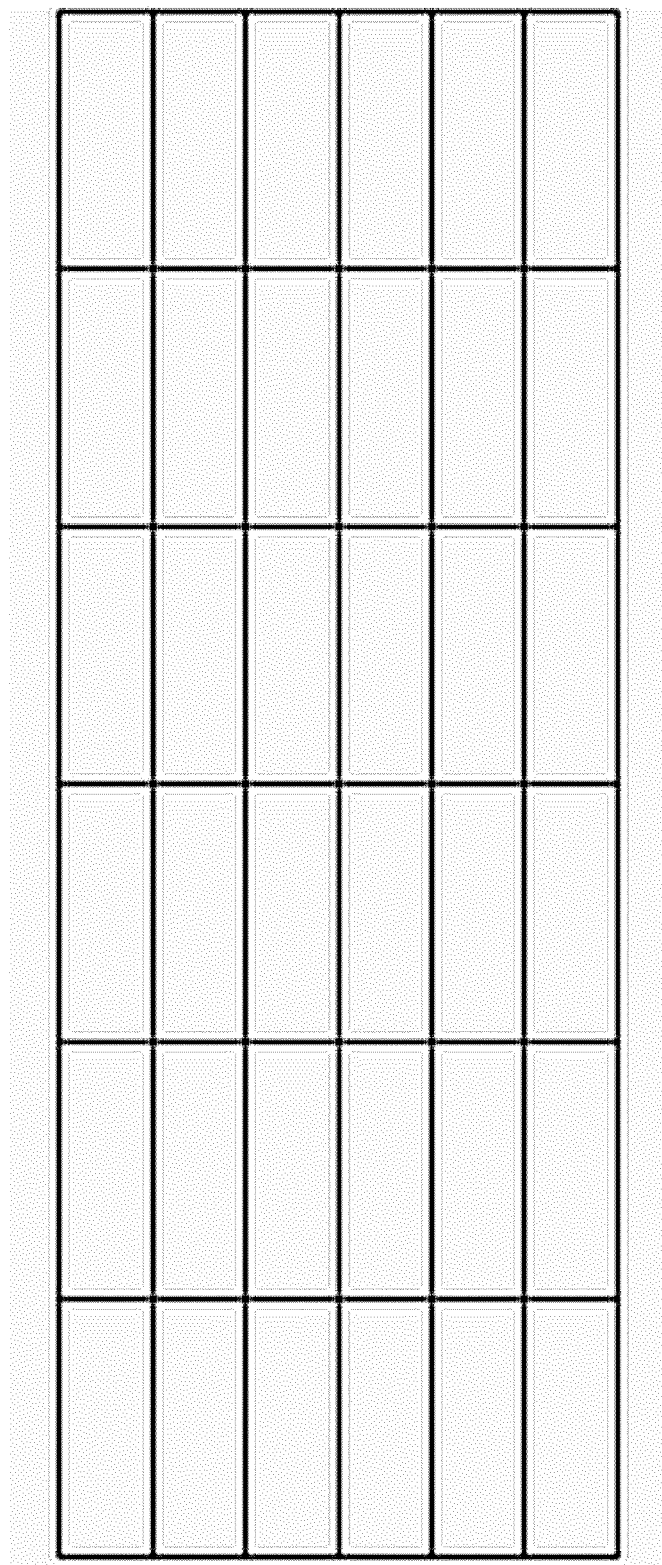
FIG. 25 illustrates the placement of block components for the tessellation shown in FIG. 24.
Figure 26:
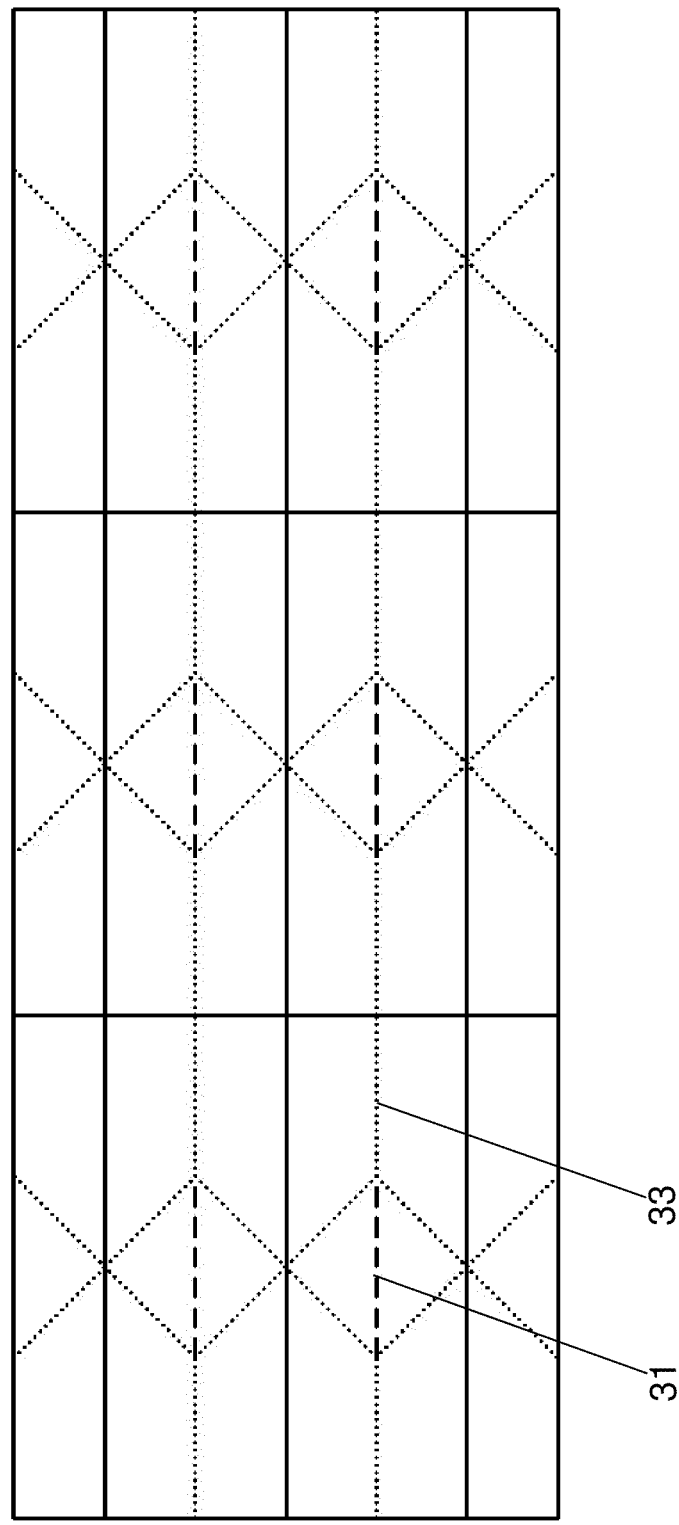
FIG. 26 shows a tessellation pattern for an embodiment fixturing method for a top sheet or folding mechanisms.

A blueprint using this embodiment of multiple copies of FIG. 23 coinciding from both the up and down direction to produce the structure shown in FIG. 8 may be found in FIGS. 24, 25 and 26. The flat folding slab may be constructed in three layers. The first layer, shown in FIG. 24, contains several adjacent copies of a tessellation; the middle layer, shown in FIG. 25, contains several adjacent blocks; the top layer, shown in FIG. 26, contains several more copies of the tessellation, and sequential layers are laminated together along tangent surfaces. The tessellation used in this embodiment is similar to that shown in FIG. 21 with the exception that the corners of the tessellation are appended to change the perimeter from hexagonal to rectangular. In FIGS. 24 and 26 the solid lines define several rectangles containing four trapezoids and two triangles—these are the rectangular-perimeter tessellations appended from FIG. 21. Six full rectangular tessellations may be seen in FIG. 24, with partial halves of the rectangle occurring on both ends. To produce the multiple tessellations the solid lines in the figure may be cut, the dashed lines 31 represent fold lines that will form valley creases, and the dotted lines 33 represent fold lines that will form ridge creases. The same coding applies to FIG. 26, with the fold convexity of both layers defined as seen from above. The middle layer of blocks is shown in FIG. 25. The blocks are glued to the trapezoidal regions in the upper and lower layers, and are not glued to the triangular regions. The boundaries of the figures are intended to align and thus the glue and fold regions of the multi-laminate are entirely defined. After gluing, the resulting construction may be folded according to the fold convexities in the drawings and is seen at various stages of folding in FIG. 8.

Figure 5:
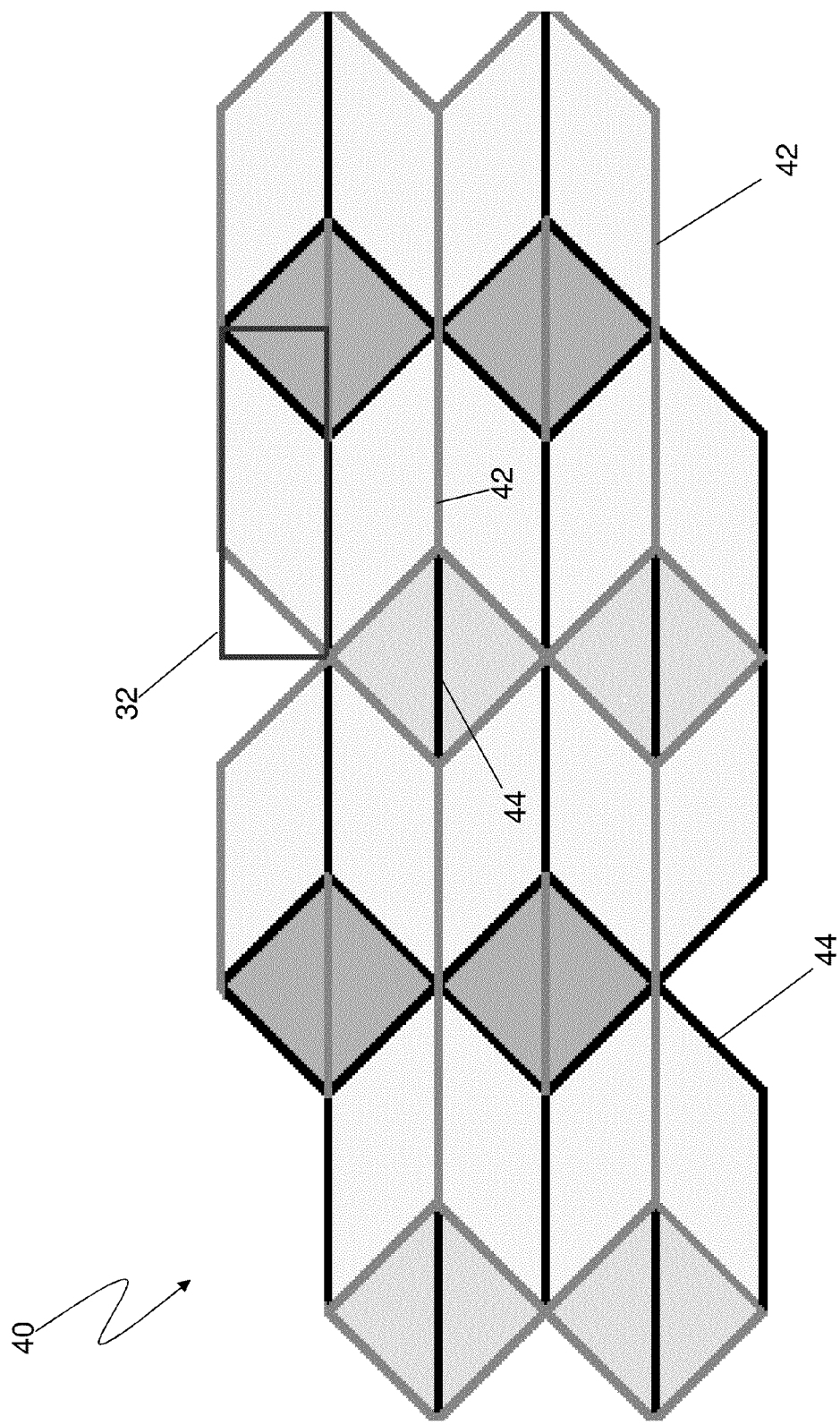
FIG. 5 illustrates another folding pattern with multiple internal vertices that may be used for an embodiment fixturing method.
Figure 6:
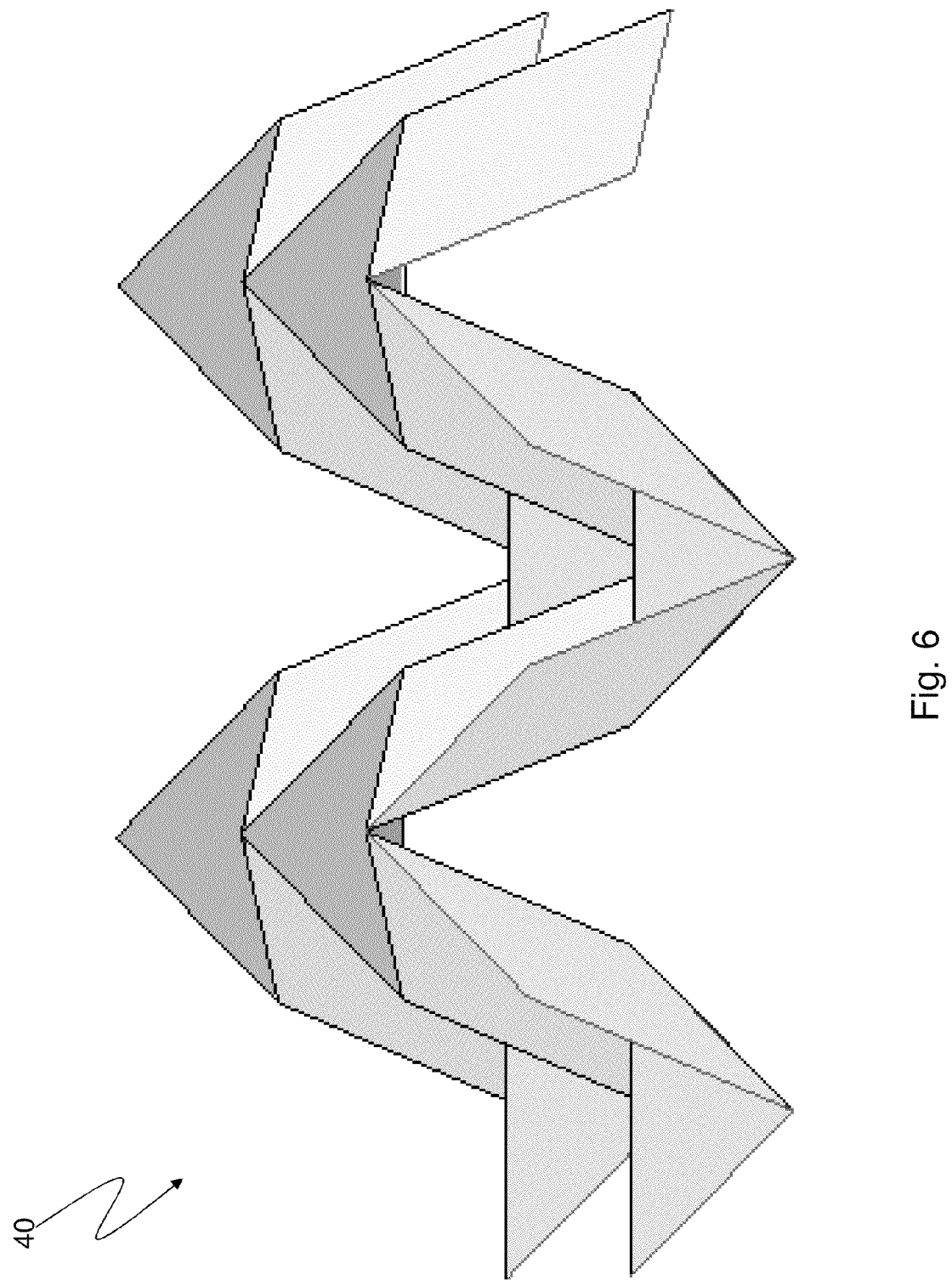
FIG. 6 is a perspective view of the partial folding of the pattern shown in FIG. 5.
Figure 7:
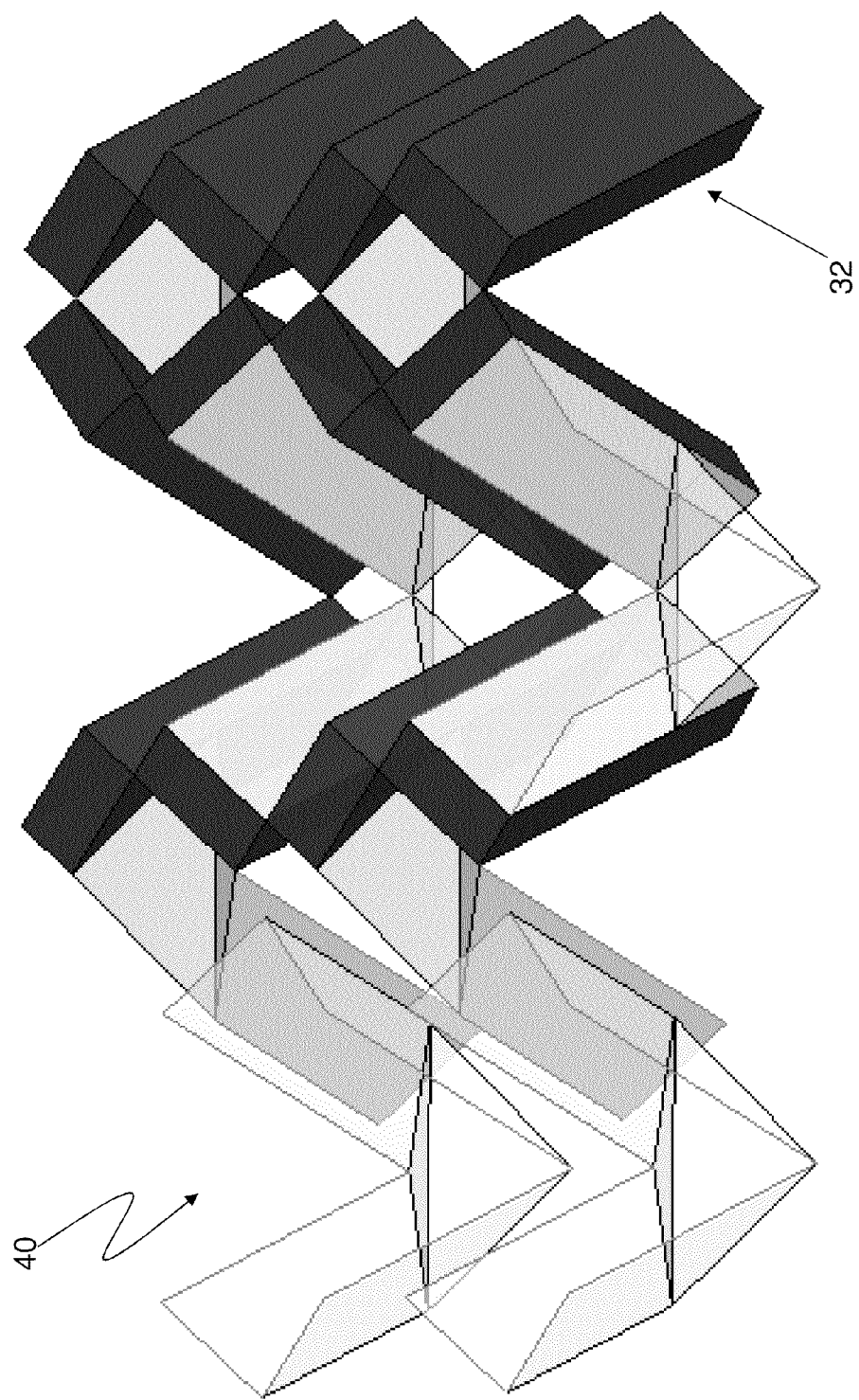
FIG. 7 is a perspective view of component blocks fixtured to a folding structure that folds in accordance with the pattern of FIGS. 5 and 6 to form a folding slab.

To further reiterate the geometry of this embodiment of a folding thickened slab, if the corners from the tessellation were cropped as in FIG. 21, and the slab had no thickness, the two outer layers of the laminate would match-up to produce the tessellation pattern type 40 shown in FIG. 5. In FIG. 5 one thin rectangular block 32 is shown. As can be seen in FIG. 23 this rectangular block 32 sticks out to overhang the triangular regions on its ends during folding, and in particular it is not glued to the triangles. The gray 42 and black 44 edges in the figure correspond to valley and ridge folds, respectively. The tessellation 40 partially folded is shown in FIG. 6. FIG. 7 corresponds to the same folding position as FIG. 6 with the tessellations having the appended rectangular perimeter and the blocks 32 with thickness used. For clarity some of the blocks are omitted. Note the four-block-configurations with the diamond openings occur in both the upward and downward orientations.

By way of example this gives a general approach to designing folding thick slabs, one embodiment explained as follows: A model folding tessellation for a thin sheet may be selected, such as the one shown in FIGS. 5 and 6. Blocks that form the slab are positioned on the sheet with overhanging that goes beyond the mounting facet so that every vertex in the model sheet has fewer surrounding blocks than it does surrounding facets. Block clusters are defined that fold effectively when affixed to portions of the model tessellation mounted from one side, as was done in FIGS. 21 and 23. Block clusters are defined that fold effectively when mounted to portions of the model tessellation that are affixed from the other side. These two sets of block clusters may be selected alternately so that each edge of the model tessellation is represented on one or the other laminate sides of the blocks, as may be seen in FIG. 7 or by comparing FIG. 24 to FIG. 26.

There are many advantages to using folding architectures to define folding slab linkages. The structure is highly reliable, as all the blocks may be connected by piano hinging, sheet folds or any other suitable hinging mechanism; adjacency is preserved block to block, and the entire pattern deploys in one continuous action. The structure may deploy in both directions enabling more versatile deployment trajectories and packaging efficiencies. Up to the constraints of volume preservation, these architectures may be designed for arbitrary expansion ratios in both directions, and may be designed to be packaged into a variously shaped transportation containers.

All publications cited in the specification, both patent publications and non-patent publications, are indicative of the level of skill of those skilled in the art to which this invention pertains. All these publications are herein fully incorporated by reference to the same extent as if each individual publication were specifically and individually indicated as being incorporated by reference.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the following claims.

What is claimed is:

1. A method for movably positioning a plurality of components, the method comprising:
    obtaining an end-configuration of the components that determines relative positioning and orientation of the components with respect to each other;
    obtaining a folding pattern comprising a plurality of interior vertices that define corresponding tessellation facets, the folding pattern providing a first folded configuration and a second folded configuration, wherein when in the second folded configuration a plurality of mounting facets selected from the tessellation facets are arranged in positions and orientations with respect to each other that correspond to the end-configuration of the components;
    obtaining a foldable structure that folds in accordance with the folding pattern and comprises mounting facets corresponding to the mounting facets of the folding pattern; and
    affixing the components to the mounting facets of the foldable structure so that movement of the mounting facets of the foldable structure is transferred to the components as the foldable structure foldably transitions between the first folded configuration and the second folded configuration.

2. The method of claim 1 wherein the foldable structure has effectively only one parameter of articulation such that an applied movement in one region of the foldable structure induces corresponding articulating movement across a substantial entirety of the foldable structure so as to cause the foldable structure to foldably transition between the first folded configuration and the second folded configuration regardless of the region to which the movement is applied.

3. The method of claim 2 wherein the first folded configuration corresponds to a planar configuration.

4. The method of claim 3 wherein the components form a thick slab when in the planar configuration.

5. The method of claim 4 wherein the components are blocks that form the thick slab and are positioned on the foldable structure so that each block overhangs its respective mounting facet.

6. The method of claim 1 wherein the foldable structure is provided by a foldable sheet material that is folded in accordance with the folding pattern.

7. The method of claim 1, wherein at least three of the mounting facets of the foldable structure rotate in parallel as the foldable structure foldably transitions between the first folded configuration and the second folded configuration.

8. The method of claim 7, wherein at least three of the components rotate in parallel as the foldable structure foldably transitions between the first folded configuration and the second folded configuration.

9. The method of claim 1, wherein at least three of the mounting facets of the foldable structure translate while remaining parallel as the foldable structure foldably transitions between the first folded configuration and the second folded configuration.

10. The method of claim 9, wherein at least three of the components translate while remaining parallel as the foldable structure foldably transitions between the first folded configuration and the second folded configuration.

11. The method of claim 1, wherein at least three of the mounting facets of the foldable structure move with cylindrical symmetry as the foldable structure foldably transitions between the first folded configuration and the second folded configuration.

12. The method of claim 11, wherein at least three of the components move with cylindrical symmetry as the foldable structure foldably transitions between the first folded configuration and the second folded configuration.

13. The method of claim 1 wherein the components are arranged in an array that contracts in two directions with or without rotation as the foldable structure foldably transitions between the first folded configuration and the second folded configuration.

14. The method of claim 1 wherein affixing the components to mounting facets of the foldable structure comprises affixing the components to mounting facets of the foldable structure when the foldable structure is in a flat state.

15. The method of claim 1 wherein either the first or the second folded configuration is in a flat state.

16. The method of claim 1 wherein the folding structure further comprises hinging materials in locations corresponding to the fold lines in the folding pattern.

17. The method of claim 1 wherein the folding structure further comprises flexible webbing in locations corresponding to the fold lines in the folding pattern.

18. The method of claim 1 wherein the folding pattern is a tessellation generated by a wave tessellation method.

19. The method of claim 1 wherein the folding pattern repeats with translational symmetry.

20. The method of claim 1 wherein the folding of the folding structure is actuated by self-assembly methods.

* * * * *